United States Patent [19]
Galles et al.

[11] Patent Number: 5,721,819
[45] Date of Patent: Feb. 24, 1998

[54] PROGRAMMABLE, DISTRIBUTED NETWORK ROUTING

[75] Inventors: Michael B. Galles, Los Altos; Robert E. Newhall, Cupertino, both of Calif.

[73] Assignee: Silicon Graphics Corporation, Mountain View, Calif.

[21] Appl. No.: 435,452

[22] Filed: May 5, 1995

[51] Int. Cl.$^6$ .................................................. G06F 13/00
[52] U.S. Cl. ............................ 395/200.15; 395/200.13
[58] Field of Search ..................... 395/200.15, 200.03, 395/200.02, 200.06, 200.1, 200.09, 200.04, 200.14, 200.16, 200.13

[56] References Cited

U.S. PATENT DOCUMENTS

| | | | |
|---|---|---|---|
| 4,868,818 | 9/1989 | Madan et al. | 371/11.3 |
| 5,105,424 | 4/1992 | Flaig et al. | 370/94.1 |
| 5,301,104 | 4/1994 | Yalamanchili | 395/800 |
| 5,307,463 | 4/1994 | Hyatt et al. | 395/275 |
| 5,313,465 | 5/1994 | Perlman et al. | 370/85.13 |
| 5,313,645 | 5/1994 | Rolfe | 395/800 |
| 5,361,334 | 11/1994 | Cawley | 395/200.15 |
| 5,386,413 | 1/1995 | McAuley et al. | 370/54 |
| 5,471,580 | 11/1995 | Fujiwara et al. | 395/200.02 |
| 5,473,599 | 12/1995 | Li et al. | 395/200.15 |
| 5,479,401 | 12/1995 | Bitz et al. | 370/60.1 |
| 5,488,735 | 1/1996 | Tanabe et al. | 395/800 |
| 5,490,258 | 2/1996 | Fenner | 395/401 |
| 5,506,838 | 4/1996 | Flanagan | 370/54 |
| 5,519,705 | 5/1996 | Fukutomi | 370/85.13 |
| 5,530,963 | 6/1996 | Moore et al. | 395/200.15 |
| 5,546,596 | 8/1996 | Geist | 395/200.02 |
| 5,566,175 | 10/1996 | Davis | 370/84 |
| 5,581,767 | 12/1996 | Katsuki | 395/800 |
| 5,594,918 | 1/1997 | Knowles | 395/800 |

OTHER PUBLICATIONS

Goodman, J. et al., "Hypertree: A Multiprocessor Interconnection Topology," *IEEE Transactions On Computers*, vol. C–30, No. 12, Dec. 1981, pp. 923–933.

Bhuyan, L. et al., "Generalized Hypercube And Hyperbus Structures For A Computer Network," *IEEE Transactions On Computers*, vol. C–33, No. 4, Apr. 1984, pp. 323–333.

Kumar, J. et al., "Extended Hypercube: A Hierarchical Interconnection Network Of Hypercubes," *IEEE Transactions On Parallel And Distributed Systems*, vol. 3, No. 1, Jan. 1992, pp. 45–57.

Louri, A. et al., "Scalable Optical Hypercube–Based Interconnection Network For Massively Parallel Computing," *Applied Optics*, vol. 33, No. 32, 10 Nov. 1994, pp. 7588–7598.

Malluhi, Q. et al., "The Hierarchical Hypercube: A New Interconnection Topology For Massively Parallel Systems," *IEEE Transactions On Parallel and Distributed Systems*, vol. 5, No. 1, Jan. 1994, pp. 17–30.

Tzeng, N.–F. et al., "Enhanced Hypercubes," *IEEE Transactions On Computers*, vol. 40, No. 3, Mar. 1991, pp. 284–294.

*Primary Examiner*—Jack B. Harvey
*Assistant Examiner*—Ario Etienne
*Attorney, Agent, or Firm*—Sterne, Kessler, Goldstein & Fox P.L.L.C.

[57] ABSTRACT

A programmable, distributed network routing system and method uses routing tables which are distributed throughout the network. Routing tables are programmed to route packets to the target device by the preferred route. When a packet is injected into the network for delivery to a particular node each router along the path taken by the packet consults its local routing table and sends the packet along the preferred route. In one implementation the router tables contained in each router contain hierarchical information about the network. For nodes that are near the subject router, a complete local table entry exists. For nodes which are more distant, several of these distant nodes share a single remote table entry. When a router receives a packet, it reads the egress port ID from the packet header and begins arbitrating for that egress port so that the packet can be sent to the next router. At the same time, the router accesses the router table to determine the egress port ID for the next router. This ID is inserted into the header before the packet is transferred to this next router.

17 Claims, 21 Drawing Sheets

ONE-DIMENSIONAL TWO-BRISTLED METACUBE 804

TWO-DIMENSIONAL ONE-BRISTLED METACUBE 806

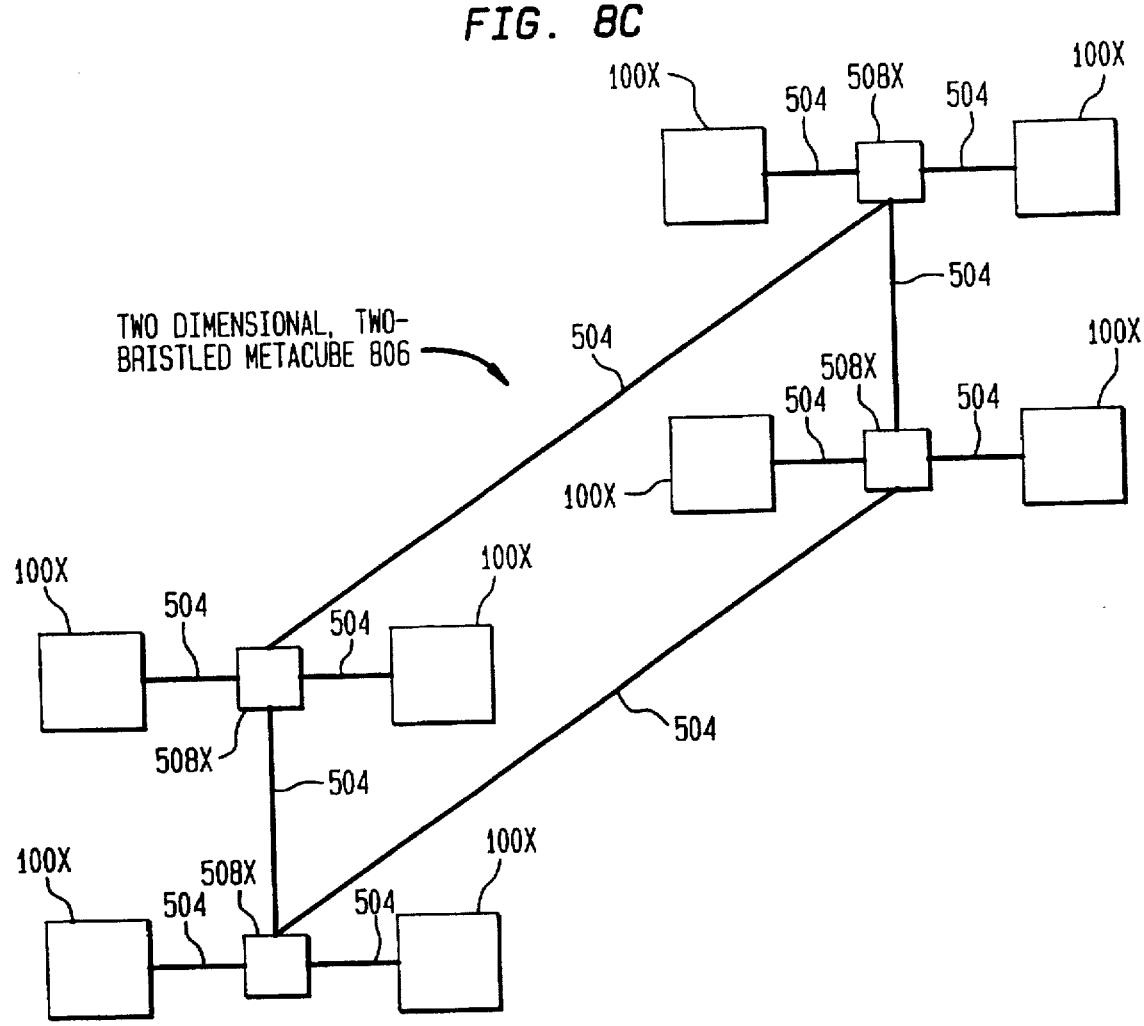

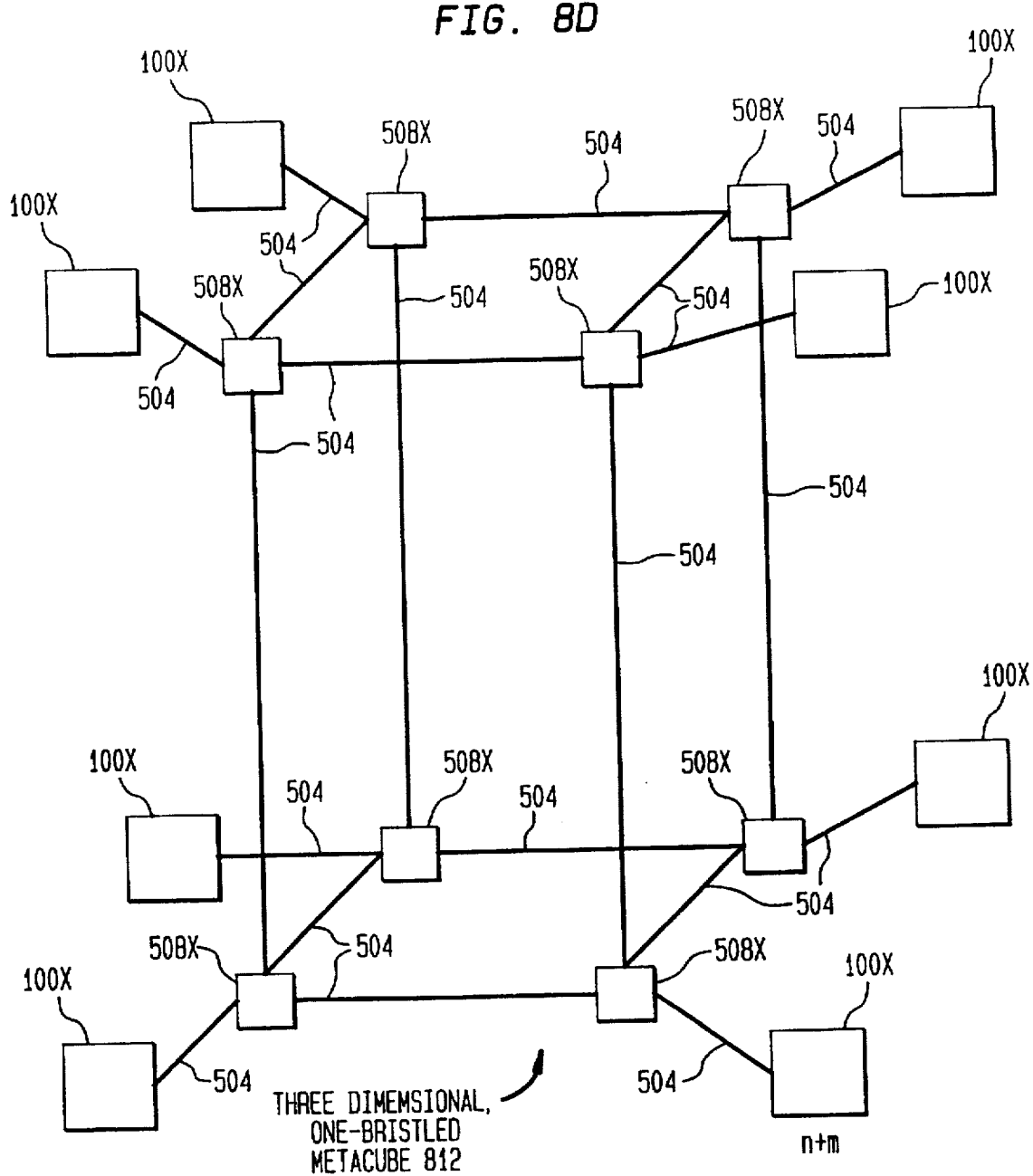

PROGRAMMABLE, DISTRIBUTED NETWORK ROUTING

RELATED APPLICATIONS

This application is related to two commonly owned applications filed on even date herewith: a first entitled "Hierarchical Fat Hypercube Architecture for Parallel Processing Systems", Ser. No. 08/435,456, and a second entitled "System and Method for Network Exploration and Access in A Multiprocessor Environment", Ser. No. 08/435, 456. The full disclosure of each of these applications is incorporated herein by reference as if reproduced in full below.

BACKGROUND OF THE INVENTION

1. Field of the Invention

The present invention is directed toward a multiprocessor communications network for connection of processing nodes and input/output (I/O) nodes in a multi-processor environment. More specifically, the present invention is directed toward a system and method for using a software programmable table to dynamically route packets along a preferred route in the communications network.

2. Related Art

Recent advances in VLSI Technology have led to the evolution of a processing environment in which large numbers of processors can be implemented in massively parallel computing systems. A cardinal element that dictates the performance of such a massively parallel computing system is the infrastructure that supports communications among the various processors: the communications network. In fact, given contemporary design criteria such as high computational bandwidth and increased parallelism, the level of communications required among processors is increasing dramatically.

Several different topologies have been proposed to interconnect the various processors in such environments so as to provide high communications bandwidth, low inter-node distance, a high network bisection bandwidth and a high degree of fault tolerance. Among these topologies are rings, stars, meshes and hypercubes.

In a multi-processor system, the routing of information from one node to another is of paramount importance. This is true regardless of the particular topology of the network. However, once an optimum route is determined and programmed into the network, there is little flexibility to change the routing to accommodate faults or network reconfiguration.

SUMMARY OF THE INVENTION

The invention is directed toward a system and method for performing a distributed programmable routing to route messages between any two nodes in a multi-processor or multi-computer communications network. According to the invention, software-programmable routing tables are distributed throughout the network to make a routing determination for each packet as it enters the node. When the packet is injected into the network for delivery to a particular node 102, each router 204 along the path taken by the packet consults a router table to determine where next to route the packet so that it can reach its destination in accordance with the preferred route.

A feature of the invention is that the router tables in each router are software-programmable. The router tables are first programmed when the system is initially configured and powered up. Because the tables are software-programmable, they can be used to support a variety of network topologies, and they can be programmed to provide an efficient deadlock-free and load-shared path between each pair of nodes in the network. Because they are software-programmable, the tables can easily be reprogrammed to account for changes in the network configuration, additions to the network, and faults which may occur in the network. As a result of the programmability aspect of the look-up tables, an efficient and highly configurable routing scheme is implemented.

An additional feature of the invention is that it can be implemented in a hierarchical fashion to more effectively accommodate large networks. Thus, for hierarchical networks having local nodes and remote nodes, the look-up table can handle this efficiently. For local nodes, which are near the routing switch, a complete local table entry exists and provides routing information to route the packet via the preferred route to that destination node. For remote nodes, a separate table is provided which provides routing information to route the packet along the preferred route to the remote node. Because this remote routing is done at the general level (i.e., it is done to route the packet to the vicinity of its destination), this remote table requires fewer entries.

A further feature of the invention is that it provides pipeline access to the router tables to deserialize the routing process at each router. Typically, the routing Of a packet via router is an inherently serial process. First, the router must decide on the appropriate egress port for the packet. Second, the router must arbitrate for this egress port and then route the packet. However, by pipelining the routing according to the invention, this process is now performed in parallel. When a new packet arrives at a router switch, its header already contains the routing information for that current router. In other words, the header already contains the egress port identification for that current router. Thus, the current router can immediately begin the arbitration process to obtain access to the egress port.

While this port arbitration is taking place, the router accesses the look-up table to determine the routing information for the next router. Specifically, the router 204 determines the egress port identification that will be used by the next router to route the packet along the preferred route. This process takes place while the current router is arbitrating for the designated egress port and provides the next direction identification to update the packet header for the next router before the packet is actually sent. Once the header is updated, the packet is routed to the next destination.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 8C and 8D illustrate two alternative embodiments for a hierarchical fat hypercube network having eight n-dimensional hypercubes.

DETAILED DESCRIPTION OF THE EMBODIMENTS

Figure 1:
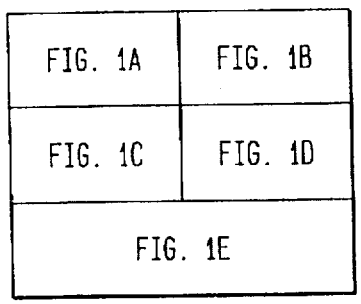
FIG. 1, which comprises
Figure 1A:
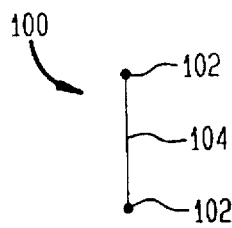
FIGS. 1A, 1B, 1C, 1D, and 1E, is a diagram illustrating a one dimensional hypercube, a two dimensional hypercube, a three dimensional hypercube, a four dimensional hypercube as a tessarect and a four dimensional hypercube illustrated as three dimensional hypercubes respectively.
Figure 1B:
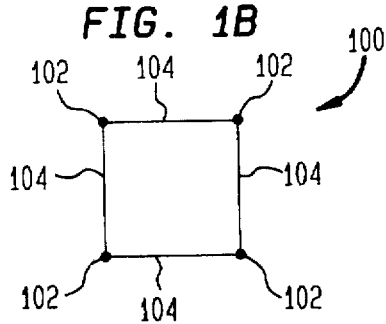
Figure 1C:
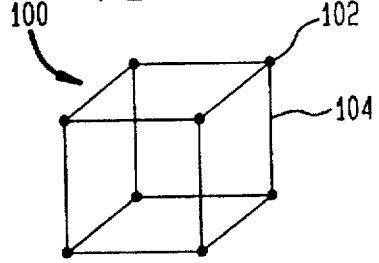

1. Overview and Discussion of the Invention

The present invention is directed toward a system and method for routing messages in a multiprocessor or multicomputer network. According to the preferred embodiment of the invention, messages are routed using a pipelined table lookup process. The tables are software programmable so that they can be easily reconfigured to support routing changes due to network reconfiguration or faults.

2. Environment of the Invention

To facilitate a thorough description of the invention, the invention is described in terms of an example environment. According to this example environment, a plurality of nodes are interconnected using a hypercube topology. Each node can include one or more processors, one or more I/O ports, and shared and/or local memory. Also described as part of the example environment is an example node configuration, including a router configuration. This example topology and node configuration are now described. Although the invention is described in terms of this example environment, it will become apparent to a person skilled in the art how to implement the invention in alternative environments having different topologies and/or different node configurations.

2.1 Basic Hypercube Topology

One multi-processor architecture that is well suited to applications requiring a large number of processors is the hypercube. In a hypercube network, a plurality of microprocessors are arranged in an n-dimensional cube where the number of nodes k in the network is equal to $2^n$. In this network, each node is directly connected to n other nodes via a single communications link, referred to as an edge. As a result, each node is connected to every other node via a plurality of communications paths. The longest communications path from any one node on the network to any other node is n-links.

FIGS. 1A, 1B, 1C, and 1D illustrate 1, 2, 3, and 4 dimensional hypercubes, respectively. Referring now to FIGS. 1A–1D, the hypercube comprises a plurality of nodes 102 connected to one another via edges 104 (i.e. links). As stated above, each n-dimensional hypercube has a plurality of nodes, where the number of nodes k is equal to $2^n$ (for a fully populated network). For example, the 4-dimensional hypercube, illustrated in FIG. 1D as a tessarect, has $2^4$, or 16, nodes 102. Each node is connected to n=4 other nodes 102 (i.e., each node 102 is connected to n edges 104), and the longest path between any two nodes 102 is n=4 links (edges 104).

One feature of the conventional hypercube is that the maximum distance between any two nodes (i.e., the diameter) in a hypercube having k nodes is given by $\log_2(k)$. Thus, even as the number of nodes increases, the maximum distance between any two nodes only increases as $\log_2$. As a result, the number of nodes, and hence the number of processors or I/O ports, can be doubled while only requiring a unitary increase in the network diameter between any two nodes. Because of this logarithmic relationship, the hypercube scales well.

Figure 1D:
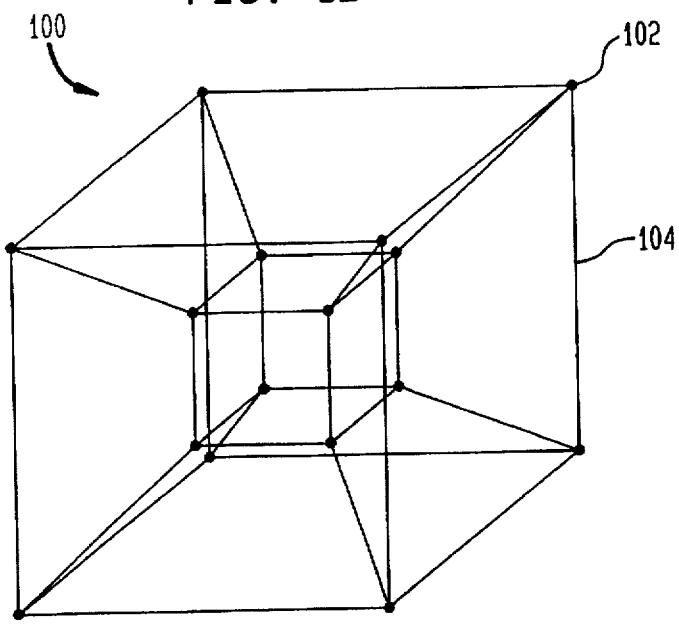
Figure 1E:
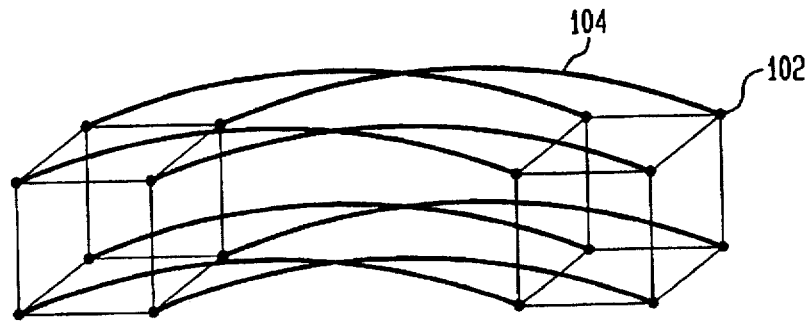

FIG. 1E is a diagram providing an alternative illustration of the conventional four-dimensional hypercube that is illustrated in FIG. 1D. In this conventional four-dimensional hypercube topology, each node 102 of a three-dimensional hypercube is directly connected via an edge 104 to a corresponding node of a second three-dimensional hypercube.

According to basic hypercube topology, for each increase in the dimension of the topology (i.e., to expand from an N-dimensional to an (N+1)-dimensional hypercube), an additional edge 104 must be connected to each node 102. Thus, it is axiomatic that to increase the dimension of a hypercube 100, each router 204 must have an additional port to support the additional connection. As a result, as the dimension of the hypercube increases the number of ports in the routers 204 increases as well.

2.2 Example Node Architecture

Figure 2:
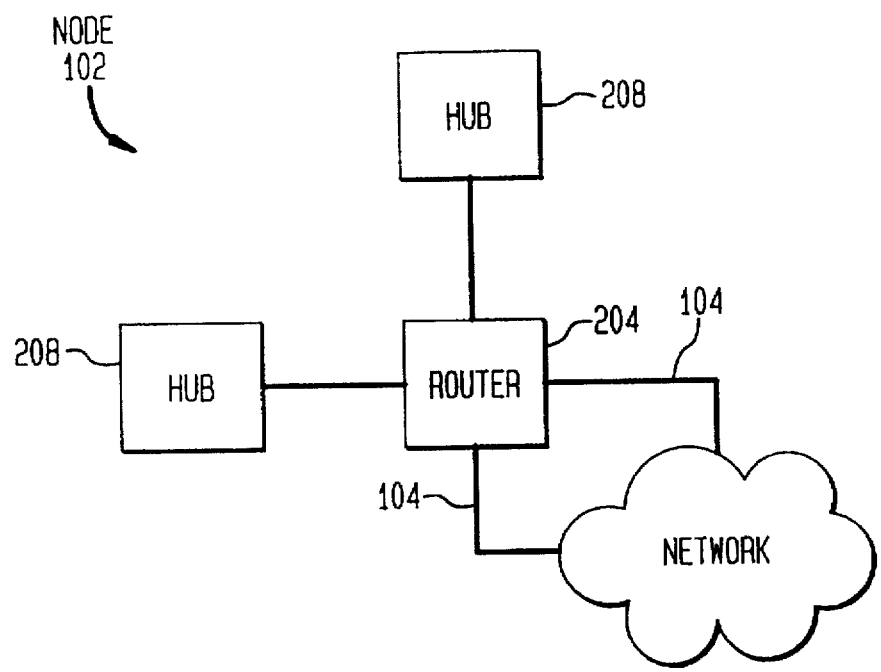
FIG. 2 is a block diagram illustrating an example configuration of a node that can be used in a multi-processor network. The node illustrated in FIG. 2 is a two-bristled node.
Figure 3:
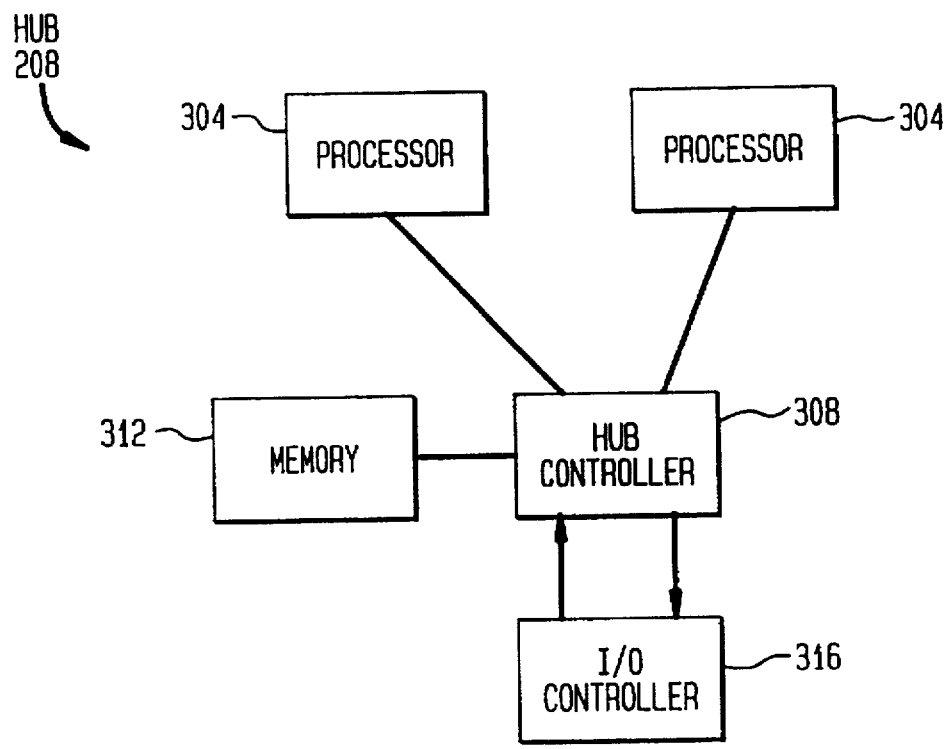
FIG. 3 is a block diagram illustrating an example architecture for a hub in a network node.

As stated above, each hypercube comprises a plurality of nodes 102 connected to one another via edges 104. The complexity of nodes 102 can vary depending on the application of the multi-processor system. In its simplest form, each node is a microprocessor functioning as a computing engine in the multi-processor system. In more complex environments, each node can support multiple processors and/or I/O functionality. The present invention is described in terms of an example node architecture wherein each node is configured as illustrated in FIGS. 2 and 3. This section of the patent document describes this example architecture.

One example of a relatively complex node architecture is illustrated in FIG. 2. According to this environment, each node comprises a router 204 and one or more hubs 208. Router 204 makes the appropriate connections between other nodes 102 of the network via edges 104 and the one or more hubs 208. Each hub 208 can include one or more processors and/or I/O devices.

Note that if a node 102 includes one hub, it is said to be one bristled. If a node 102 has two hubs 208, it is said to be two bristled, and so on. Further note that if the node illustrated in FIG. 2 is implemented in a 4-dimensional hypercube, router 204 would have to be a six-port router: one port for each of the four edges 104 and one port for each of the two hubs 208. Also note that in one embodiment hubs 208 can have multiple network ports for reliability.

FIG. 3 is a diagram illustrating an example architecture of a hub 208. Hub 208 comprises one or more processors 304, a controller 308, memory 312 and an I/O controller 316. Although any of numerous processors can be chosen for processor 304, in one environment processor 304 is a superscalar RISC processor such as the T5 (R10K) MIPS processor, available from Silicon Graphics, Inc., California, USA.

Hub controller 308 controls access to the resources of hub 208 by other hubs 208 on the network. Memory 312 provides local memory to the processors 304 and can also be shared among processors across the network and with I/O devices connected to this or other nodes 102. I/O controller 316 provides a network interface to one or more I/O devices.

2.3 Example Router Configuration

Although numerous different router configurations may be implemented to provide the connectivity among the various nodes in the network, the present invention is described in terms of a specific, simplified, example router configuration. This simplified example router configuration is illustrated in FIG. 4.

Figure 4:
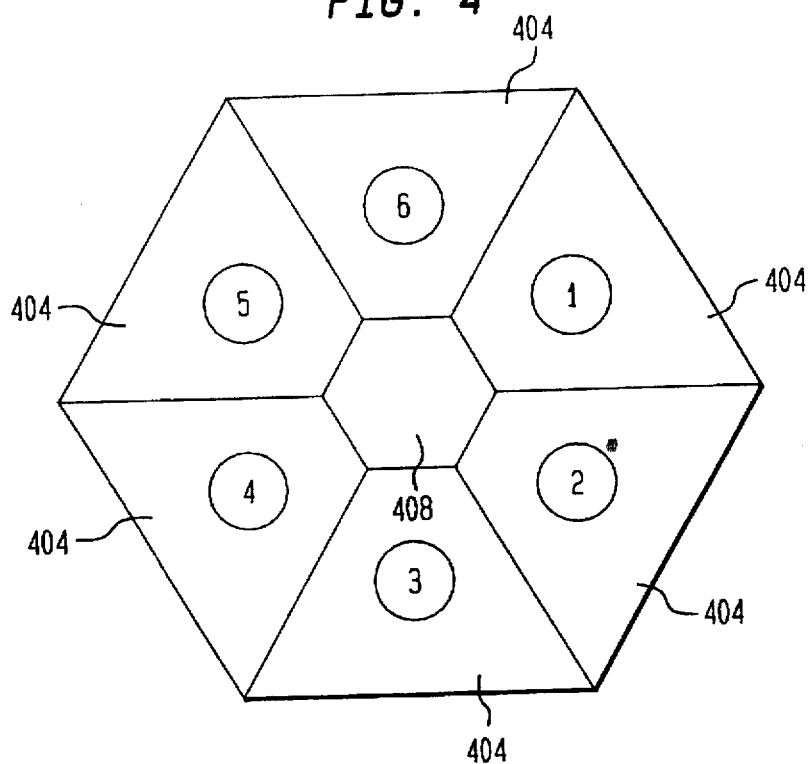
FIG. 4 is a diagram illustrating an example configuration of a router 204 that can be used to provide connectivity between nodes of a communications network.

Referring now to FIG. 4, the router consists of six ports 404 and a crossbar 408. Although any number of ports 404 can be provided, six is chosen for the example configuration because it is a cost-effective and practical number to implement. Note that the actual number of ports chosen for a given implementation will depend on a number of factors, including the network topology and the number of nodes in the network. The choice of the number of ports is also based on desired expandability of the network. Further note that in one embodiment, each port 404 can be an ingress port 404 or an egress port 404 depending on whether it is receiving or transmitting data. Also note that in a full-duplex embodiment, a port 404 can simultaneously transmit and receive data.

Each port 404 can be connected to an edge 104 or a hub 102. Each port is further connected to every other port 404 in router 204 by way of crossbar 408. Information entering a router via a first port 404 can be routed from the port at which it entered (i.e., the ingress port) to an egress port 404 by way of crossbar 408. The information is routed to a desired node 102 or to a hub 208 connected to router 204 by selecting the appropriate egress port 404. This simplified example router configuration is used throughout this document to facilitate description of the invention.

2.4 Hierarchical Fat Hypercube Topology

In one variation of the conventional hypercube topology, a hierarchal fat hypercube topology is implemented to provide a manageable technique for handling an increase in the number of nodes in a multi-processor system. Instead of simply expanding the dimension of the hypercube, as is done in conventional hypercube systems, the hierarchical fat hypercube topology adds another level to the network, thus providing a hierarchical topology.

Figure 5:
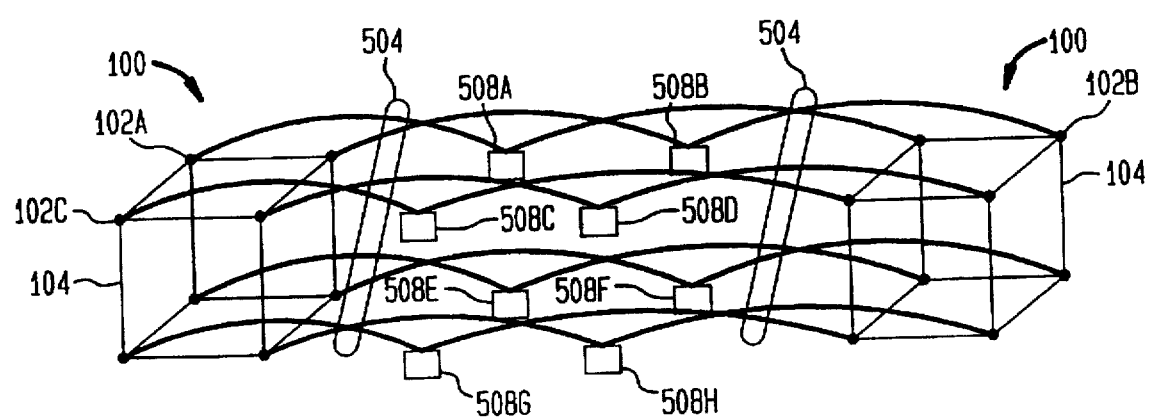
FIG. 5 is a diagram illustrating a 16-node network configure according to a hierarchical fat hypercube topology.

FIG. 5 is a diagram illustrating the manner in which the equivalent of a four-dimensional hypercube is implemented using the hierarchical fat hypercube topology. The topology illustrated in FIG. 5, is capable of supporting the same number of nodes 102 as was supported by the four-dimensional topology illustrated in FIG. 1E.

Referring now to FIG. 5, one embodiment of a hierarchical fat hypercube topology having 16 nodes 102 is illustrated. In this embodiment, two three-dimensional hypercubes ($2^3=8$ nodes each) are interconnected to form an infrastructure supporting a total of 16 nodes. According to the invention, however, the manner in which the two three-dimensional hypercubes are interconnected is quite different from the conventional 16-node topology illustrated in FIGS. 1D and 1E.

According to the invention, each node 102 of one three-dimensional hypercube is connected to the corresponding node 102 of the second three-dimensional hypercube via a router 508. This is in contrast to the basic four-dimensional hypercube topology where each node of one three-dimensional hypercube is directly connected to a corresponding node of the second three-dimensional hypercube.

Thus, to obtain, for example, the equivalent of an (n+1)-dimensional hypercube using two n-dimensional hypercubes, the corresponding nodes of the n-dimensional hypercubes are not merely connected together. Instead, they are connected using additional routers 508. It should be noted, that in one embodiment, routers 508 can be implemented using devices identical to routers 204. In fact, to simplify system design and fabrication, this is the case in the preferred embodiment.

Inherent in this hierarchical fat hypercube topology is the concept of multiple levels. According to the embodiment illustrated in FIG. 5, the hierarchical fat hypercube topology has two levels. A first level is comprised of two or more n-dimensional hypercubes, each hypercube having $2^n$ nodes 102, and each node having n edges 104 connected thereto. Each node also has an additional edge that connects the node to the second level.

The second level is a p-dimensional hypercube, referred to as a metacube. The metacube has $2^p$ nodes connected together using edges in a manner similar to the typical hypercube topology. However, as described below, the number of routers per node and the number of edges between each node pair in the metacube is scaled according to the dimension of the first-level hypercubes. This is in contrast to the conventional hypercube which has only a single edge between each node pair.

When the topology is implemented for a small network, such as the 16-node network illustrated in FIG. 5, there is a disadvantage over the conventional topology illustrated in FIG. 4. This disadvantage is that the hierarchical topology requires the addition of routers 508 to make the interconnects between the n-dimensional hypercubes of the first level. Thus, to interconnect the same number of nodes (and therefore the same number of network resources) additional hardware is required. Because of this disadvantage, it may be undesirable to implement a simple 16-node system using this topology. However, one advantage of the hierarchical fat hypercube is it's expandability. Because of this expandability aspect (described below), it may be advantageous to implement a simple 16-node system as illustrated in FIG. 5 where the system is likely to be expanded in the future.

As briefly stated above, one advantage of the hierarchical fat hypercube is that it is easily expandable. That is, if the network is implemented using the hierarchical fat hypercube topology, the system is expandable to include additional nodes without having to change the routers 204, 508 of the initial network. For example, consider an implementation that uses six-ported routers 204 (i.e., each router 204 having six ports) at each node. With the conventional topology illustrated in FIG. 4, if two hubs are connected to each node (i.e., a two-bristled system), along with the four edges 104 required for the four-dimensional topology, there are no available, unused ports on routers 204. Thus, in its present configuration, that conventional hypercube could not be expanded to a include additional nodes 102.

Figure 7:
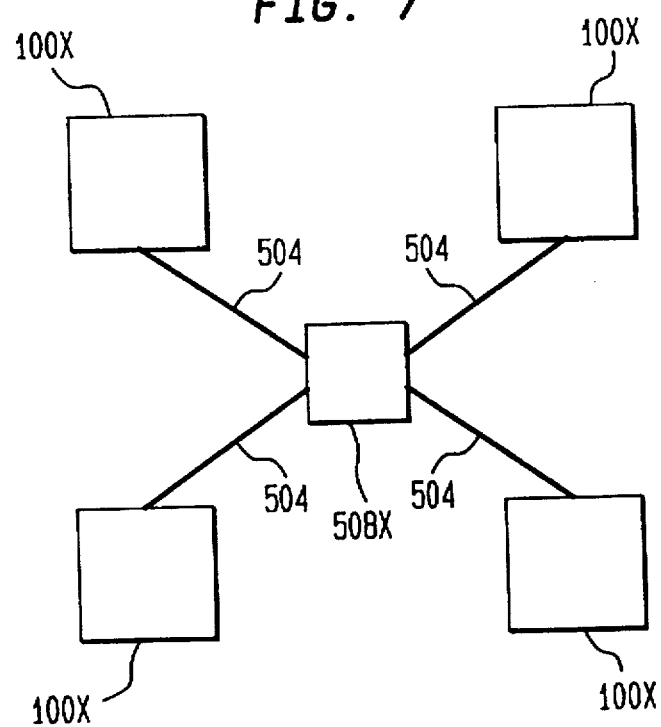
FIG. 7 is a diagram illustrating in the alternative drawing convention a hierarchical fat hypercube network having four n-dimensional hypercubes at a first level connected to a zero-dimensional metacube at the second level.
Figure 8:
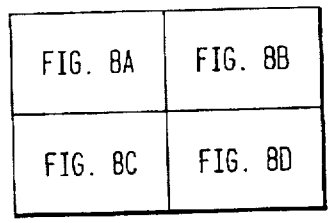
FIG. 8, comprises FIGS. 8A, 8B, 8C and 8D.
Figure 9:
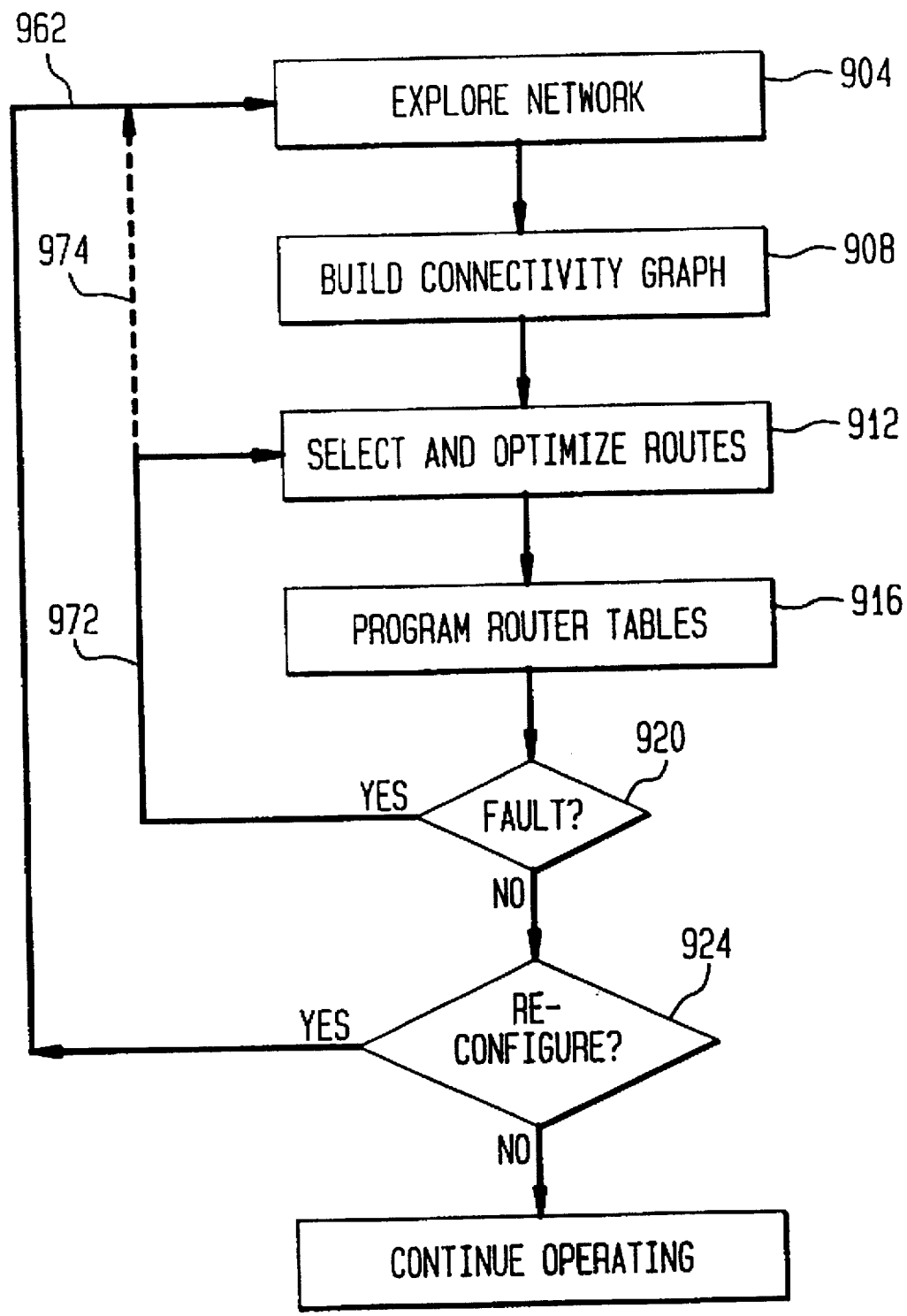
FIG. 9 is an operational flow diagram illustrating network exploration, mapping, route determination and rerouting.

However, given the same six-ported routers to implement the routers 204 and routers 508 in the topology illustrated in FIG. 5, routers 508 have additional ports to which additional network connections can be made. Thus, additional hypercubes can be connected to this topology via these available ports on routers 508. Examples of this sealability aspect are illustrated in FIGS. 7, 8, and 9 which are discussed in more detail below. As a specific example, FIG. 7 illustrates the network of FIG. 5 with two additional n-dimensional hypercubes attached to the metalevel. In this expanded form, the number of nodes (and hence the number of processors) is doubled as compared to the network illustrated in FIG. 4. The embodiment illustrated in FIG. 7 is described in greater detail below.

A further aspect of the expandability of the hierarchical fat hypercube topology is that it allows additional nodes to be added without requiring an increase in the number of edges connected to each first-level node 102. Remember that for the conventional hypercube, a increase in dimension of the hypercube from n to n+1 results in a unitary increase in the number of edges connected to each node. With the hierarchical fat hypercube, once the second level is added, additional nodes can be added without requiring additional connections to the first level. Note that such expansion is made while also maintaining a constant bisection bandwidth relative to the number of nodes in the network.

2.4.1 Drawing Convention

Figure 6:
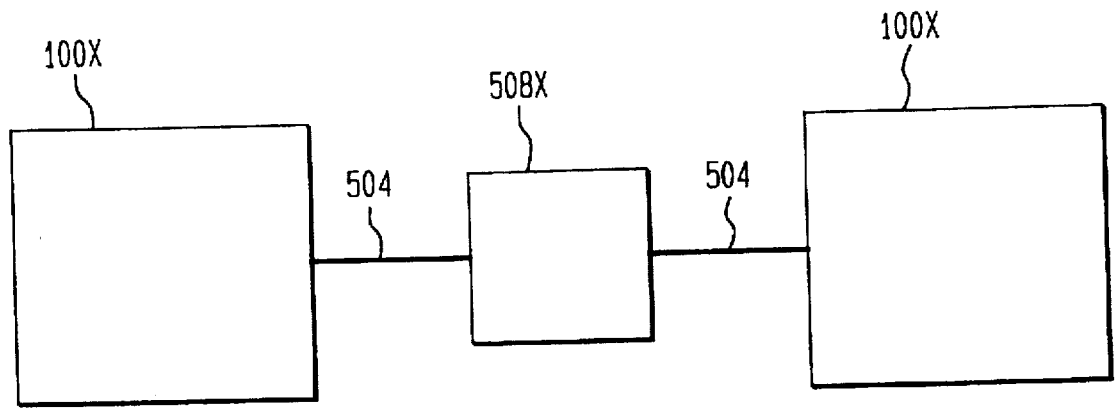
FIG. 6 is a block diagram illustrating an alternative drawing convention for the network depicted in FIG. 5.

FIG. 6 is a diagram illustrating an alternative way of depicting the hierarchical topology as illustrated in FIG. 5. This alternative drawing convention is adopted to simplify the drawings so that they can be more readily understood. This alternative drawing convention is now described. The drawing and the description are made so as to describe the convention in terms of the embodiment illustrated in FIG. 5. After reading this description, it will become apparent to a person skilled in the relevant art, how to adopt this convention for alternative embodiments.

Referring now to FIG. 6, according to this alternative convention, a single router block 508X is drawn to illustrate the collective grouping of all the routers 508 implemented to interconnect the two hypercubes 100. Similarly, a single line labeled 504 is used to illustrate the plurality of edges between routers 508 (i.e., router block 508X) and the hypercube. Additionally, the hypercube is illustrated as a 'black box' 100X to illustrate that it can be of any dimension.

Casting this description specifically in terms of FIG. 5, hypercubes 100X each represent the three-dimensional hypercubes of that topology. The router block 508X is the single node ($2^0=1$) of the zero-dimensional metacube that makes up the second level of the hierarchical fat hypercube network. Router block 508X is comprised of the individual routers 508A–508H used to interconnect the individual nodes of the three-dimensional hypercubes via the edges 504. Further note that routers 508A–508H can be implemented using routers 204 identical to those used in nodes 102. This drawing convention is used throughout this patent document to simplify the drawings and to more clearly illustrate the hierarchical fat hypercube environment.

2.4.2 Additional Embodiments of the Hierarchical Topology

This section illustrates a few of the alternative networks that can be implemented using the hierarchical fat hypercube topology of the present invention. For each of these drawings, the first level of the hierarchical topology is illustrated with a "black box" 100X to illustrate an n-dimensional hypercube 100 of any dimension. Additionally, it is important to note that this first level could itself be implemented using a hierarchical topology.

Note that for the hierarchical fat hypercube topology, the number of edges 504 used to connect each first-level n-dimensional hypercube to the second level metacube is equal to $2^n$, (i.e., one per node). Similarly, the number of routers 508 required to make this connection is $2^n$ as well. This feature provides a high communications bandwidth.

FIG. 7 illustrates an embodiment of the hierarchical fat hypercube topology where the first level is an n-dimensional hypercube 100X, and the second level is a zero-dimensional metacube. According to this embodiment, four n-dimensional hypercubes 100X are interconnected using a single-node, zero dimensional metacube that is comprised of router block 508X.

For the specific example described above where router 508 has six ports, this particular embodiment can easily be modified to interconnect anywhere from two through six n-dimensional hypercubes 100X via a zero-dimensional metacube at the second level. In fact, as briefly noted above, the topology illustrated in FIG. 7 is a simple expansion of the topology illustrated in FIG. 5, where two additional n-dimensional hypercubes 100X have been added via router block 508X.

Figure 8A:
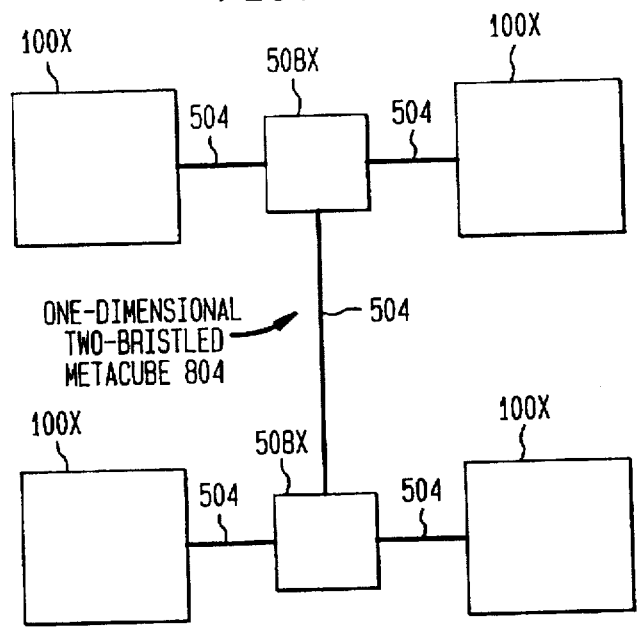
FIGS. 8A and 8B illustrate two alternative configurations for a hierarchical fat hypercube network having four n-dimensional hypercubes.

FIG. 8A is a diagram illustrating yet another embodiment of the hierarchical topology. In this embodiment, the second level is a one-dimensional, two-bristled metacube 804. In this embodiment, metacube 804 has 2 nodes comprised of router blocks 508X. Again, sealability can be accomplished by utilizing additional router ports within the routers 508. These additional ports can be utilized to connect to additional n-dimensional hypercubes 100X to the metanodes. Note that such an expansion results in an increase in the bristling of this level. For example, adding an additional n-dimensional hypercube 100X to each router block 508X results in the metalevel metacube 804 being three-bristled. As described below, this diminishes the bisection bandwidth relative to the number of nodes in the network.

Another way to expand the network is to connect to additional router blocks at the metalevel to support additional n-dimensional hypercubes 100X. FIG. 8C, described in detail below, illustrates an example of such expansion.

Figure 8B:
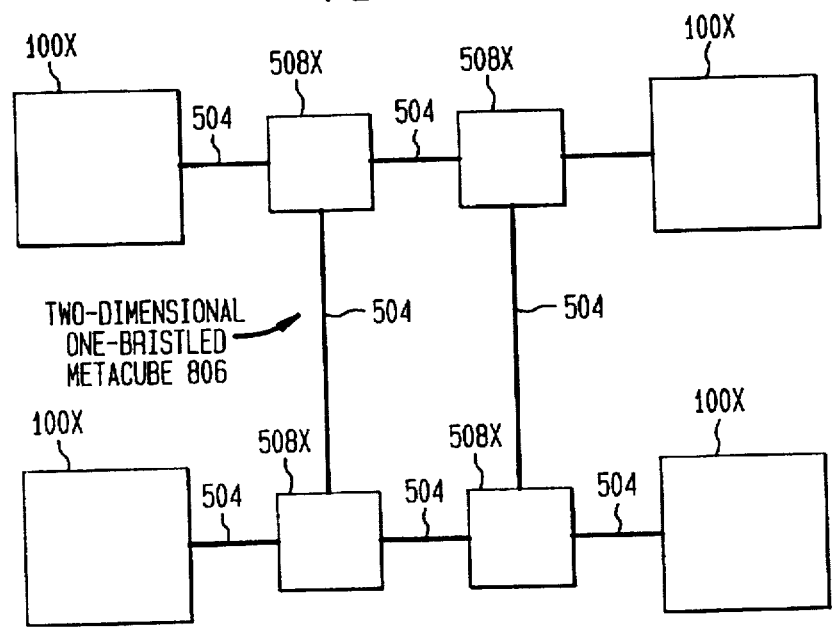

FIG. 8B illustrates an implementation of the network of FIG. 8A, but with a two-dimensional, one-bristled metacube 806. To achieve this topology from that illustrated in FIG. 8A, two router blocks 508X, comprising n routers 508 each, and three sets of n edges 504 are added. The advantage obtained by this additional hardware is an increased bisection bandwidth relative to the number of nodes in the network.

The metacube 804 of the network illustrated in FIG. 8A is a one-dimensional, two-bristled implementation of the topology illustrated in FIG. 7. The network has $k=(2^n*4)$ nodes. Because metacube 804 is two-bristled, the worst-case bisection bandwidth is k/4. Contrast this to the network in FIG. 8B which implements the metalevel as a two-dimensional, one-bristled metacube 806 where the worst-case bisection bandwidth is k/2. This simple example serves to illustrate why, according to the preferred embodiment, the second level is implemented as a one-bristled level.

Thus, when implementing a network using the hierarchical fat hypercube topology, a tradeoff can be made between the number of routers 508 implemented and the bisection bandwidth. When comparing FIGS. 8A and 8B it is easy to see that by adding additional router blocks 508X at the metalevel so that metacube 806 remains one-bristled the bisection bandwidth per node remains constant at k/2. Alternatively, the additional router blocks 508X can be omitted at the cost of decreased bisection bandwidth per node.

FIG. 8C is a diagram illustrating an embodiment of the hierarchical fat hypercube topology wherein the second level is a two-dimensional two-bristled metacube 806. In the specific embodiment illustrated in FIG. 8C, there are eight n-dimensional hypercubes 100X at the first level. The total number of nodes in the network is $k=(2^n*8)$. The n-dimensional hypercubes 100X are connected by four router blocks 508X as illustrated.

Again, as with the other embodiments, sealability is accomplished by adding onto the network at router blocks 508X. For example, a duplicate of the network can be connected to the existing network by connecting the corresponding router blocks 508X. This would result in a two-bristled, three dimensional metalevel illustrated as metacube 808 (a two-bristled version of the embodiment illustrated in FIG. 8D).

Note that, as is the case with the topology illustrated in FIG. 8A, the two-bristled second level illustrated in FIG. 8C results in a worst-case bisection bandwidth of k/4. Thus, it may be preferable to add additional router blocks 508X to the network to implement a one-bristled metalevel and maintain a bisection bandwidth of k/2. Such a one-bristled embodiment is illustrated in FIG. 8D.

In the embodiment illustrated in FIG. 8D, wherein the second level is a three-dimensional, one-bristled metacube 812. Note that the worst-case bisection bandwidth in this topology is k/2. Compare this to the topology illustrated in FIG. 8C where the worst-case bisection bandwidth is k/4. Thus, by maintaining the second level as a one-bristled level, the bisection bandwidth can be maintained at k/2 at a cost of additional routers and edges.

Note also that the network illustrated in FIG. 8D is an expanded version of that illustrated in FIG. 8B to achieve such expansion, the network of FIG. 8B is duplicated and the two networks are connected at the corresponding router blocks 508X. Further note that the network illustrated in FIG. 8D could have its number of nodes (n-dimensional hypercubes 100X) doubled in at least two ways. The easiest way to double the network is to make the three-dimensional metalevel two bristled. This doubles the number of nodes, but decreases the bisection bandwidth relative to the number of nodes.

A second way is to make the metalevel a four-dimensional (tessarect), one bristled metacube having 16 n-dimensional hypercubes as nodes. This is accomplished by duplicating the network and connecting the corresponding router blocks 508X of the two networks.

Further note that this four-dimensional metalevel could further be made two bristled so that there are 32 n-dimensional hypercubes 100X. Of course, such expansion would result in a decreased bisection bandwidth relative to the number of nodes.

Also note that each embodiment disclosed herein, is simply an expansion of the basic embodiment illustrated in FIG. 5. The changed factors are the dimension of the metalevel and the bristling factor.

It is interesting to view these networks in terms of some example numbers. For the network illustrated in FIG. 8D, assume that the first level is comprised of four-dimensional hypercubes. The total number of nodes k is $8*2^4=128$. The bisection bandwidth is (24 edges*4 edge sets)=64 edges, which is k/2 relative to the number of nodes. Note that the maximum network diameter is n+m+2=9 and the maximum cable length is constrained due to the intermediate routers 508 at the metalevel. Also note that for networks where nodes 102 have two hubs 208 with two processors each, the number of processors is 512.

After reading the above description, it should become apparent to a person skilled in the relevant art how various additional alternative embodiments of the hierarchical topology can be implemented having an n-dimensional first level and an p-dimensional second level, wherein n and p are integers, and further, wherein n and p can, but need not, be the equal. It should also become apparent to a person skilled in the relevant an that a third level could also be added to the hierarchical fat hypercube topology to further take advantage of the hierarchical structure.

2.5 Example Environment Summary

As stated above, the present invention is described in terms of this example environment as presented above with reference to FIGS. 2, 3 and 4. And further in terms of the hierarchical fat hypercube topology described above with reference to FIGS. 5–9. Description in terms of this example environment is provided for convenience only. It is not intended that the invention be limited to application in this example environment. In fact, after reading the following description, it will become apparent to a person skilled in the relevant art how to implement the invention in alternative environments using alternative topologies, node architectures and/or router configurations other than those described above.

3.0 Dynamic Network Routing

At the highest level, dynamic routing is an automated system and method for determining the configuration of a network and using the obtained information to make routing determinations to optimally route packets between each node pair.

FIG. 9 is a high level flow diagram illustrating the process of dynamic routing at this high level. In a Step 904, one or more nodes on the network explore the network to obtain information about each of the other nodes and the connection paths therebetween. This information includes configuration information identifying routers 204 explored, identifying routes between the nodes 102 and connectivity information including what devices are connected to each of the router ports 404. This step of network exploration is described in more detail in Section 4 of this document.

In a Step 908, the configuration information is used to map the network. In one embodiment, this is accomplished by building a connectivity graph which is used in making routing determinations between node pairs. Ideally, the connectivity graph is in a machine-readable format so that the process of making routing determinations can be performed automatically, via one or more processors on the network.

In a Step 912, the connectivity graph is used by one or more of the processors in the network to determine the optimal routing between each pair of nodes. Specifically, the connectivity graph is used to identify network connections between and among the various nodes of the network based on the actual network configuration. This connectivity information is used to determine an optimum route between each node pair. The steps of building the connectivity graph and determining the optimum routing are described in more detail in Section 5 of this document.

In a Step 916, the optimum-routing information is used to program router tables within each node 102 and the nodes 102 dynamically route the messages (preferably packets) along the preferred path. Once this routing information is programmed, each node 102 can route a received packet to its target destination along the preferred route. This process of routing a packet along the preferred route is described in more detail in Section 6 of this document.

In steps 920 and 924, the network continues to operate using the determined routing information until a fault occurs or until the network is reconfigured. In the event the network is reconfigured, the process of dynamic routing begins again with the step of exploring the network to determine the actual configuration. This is illustrated by flow line 962.

In the event of a fault, the network can also be re-explored as was the case with the reconfiguration. However, in the case of most faults, a re-exploration of the network is not necessary. Therefore, according to a preferred embodiment, when a fault occurs existing configuration information is used to determine a new route around the fault and the router tables in the affected nodes 102 are reprogrammed to reflect the new route. This is illustrated by flow line 972. Dashed line 974 illustrates that after a fault, the network can also be re-explored. However, for most faults, it is not foreseeable that a complete re-exploration would be required.

Having thus described the high level process of dynamic routing, each of the steps of network exploration, network mapping, route determination, route programming, and packet routing are now described in greater detail. After reading these descriptions, it will become apparent to a person skilled in the relevant art, how one or more of these steps can be replaced with conventional techniques while still reaping some of the advantages of the presented steps. For example, the step of determining the optimum routing can be performed using conventional manual techniques. In such a scenario, exploration could still be done automatically as described below and a connectivity graph providing the information in human-readable format can be provided to the person determining the optimum routes between each node pair. Once the optimum routes are determined between the node pairs they can be plugged back into the computer so that the router tables can be built to enable routing of packets along the preferred routes. As a further example, even the step of exploration could be omitted and thus, the entire process of route determination performed manually. This scenario may be especially realizable for small networks.

4.0 Network Exploration

As stated above, the first step of dynamic routing begins with exploration of the network. Described in this section of the document is a novel approach for exploration of a network. This approach is especially useful for arbitrary networks and for large, reconfigurable networks.

Regardless of the topology implemented, it is useful to have a system and method for exploring and mapping the network to determine the exact configuration in terms of the number of nodes and the valid connections among each of the nodes. As stated above, the present invention is described in terms of the example topology disclosed in Section 2 of this document. However, after reading this description, it will become apparent to a person skilled in the relevant art how to perform network exploration according to the invention in any of numerous alternative environments, including alternative topologies.

4.1 Example Router Architecture

Figure 10:
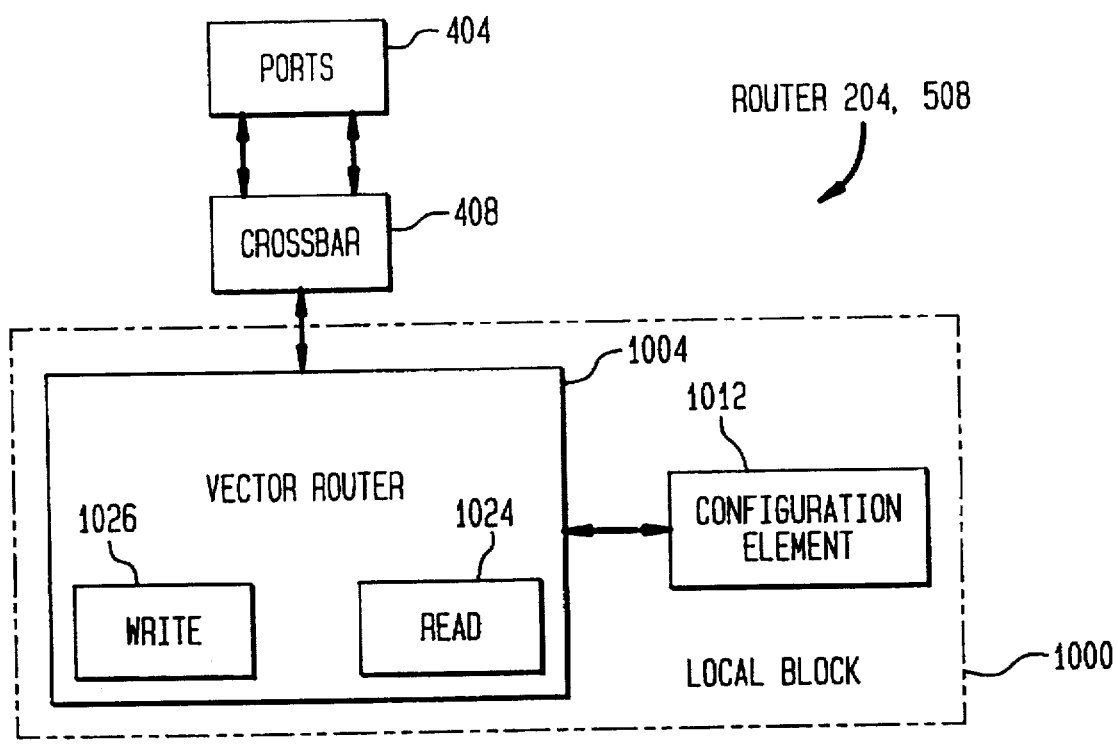
FIG. 10 is a block diagram illustrating an example architecture that can be used for routers in a communications network including routers at the first level and routers at the metalevel.

The routers 204, 508 used within the topology include additional functionality to support the network exploration feature of the invention. An example functional architecture for the routers 204, 508 is presented in FIG. 10. According to a preferred embodiment, routers 204 and 508 are implemented using this example architecture.

Routers 204, 508 are comprised of ports 404 and a crossbar 408. Routers 204, 508 also include a local block 1000 comprised of a vector router 1004 and a configuration block 1012. According to the preferred embodiment, routers 204 and routers 508 are implemented as identical routers. These routers 204, 508 are generally referred to as router(s) 204 throughout the remainder of this document.

As discussed above, ports 404 provide input and output ports 404 (i.e., ingress and egress ports) for accepting data from a first node 102 and sending data to a second node 102. Vector router 1004 is used to examine routing information contained in a received vector-routed data packet 1300 (illustrated in FIG. 13) and to route that packet out of a selected egress port 404 based on the routing information. Vector router 1004 includes a read element 1024 and a write element 1026. Read element 1024 reads routing information from the received data packet to determine the appropriate egress port 404. Write element 1026 is capable of writing information to the received packet to indicate routing information such as the input port 404 at which the packet was received. This write functionality allows each packet to be updated with interim routing information as the packet is routed across the network.

Configuration element 1012 stores configuration information regarding the configuration of the particular router 204, 508. This information can include such parameters as the revision number of the router 205, 508, the router ID (identifier), the quantity of ports 404 of the router 204, 508, the status of these ports (i.e. active, faults, etc.), and other like information.

Network exploration and mapping is described as follows in terms of the architecture described in this Section 3.1. After reading this description, it will become apparent to a person skilled in the art how the invention can be implemented using alternative architectures for routers 204,508. Note that in a preferred embodiment, routers 204 and 508 are functionally and physically equivalent, and each is implemented according to the architecture described above with reference to FIG. 10. The term router 204 is used throughout the balance of this document to generally refer to a router 204 or a router 508.

4.2 Detailed Description of Network Exploration

According to the invention, the network is automatically explored and, as a result of the exploration, mapped to determine the exact configuration of the network. This accomplished by sending vector-routed packets 1300 across the network in various directions from an origin node. During packet transmission, as the packets are sent from router 204 to router 204, the packets gather information about the network, and specifically about each router 204 through which they are routed. The packets are then returned to the origin, where the network information is compiled to map the network. This process is now described.

Figure 11:
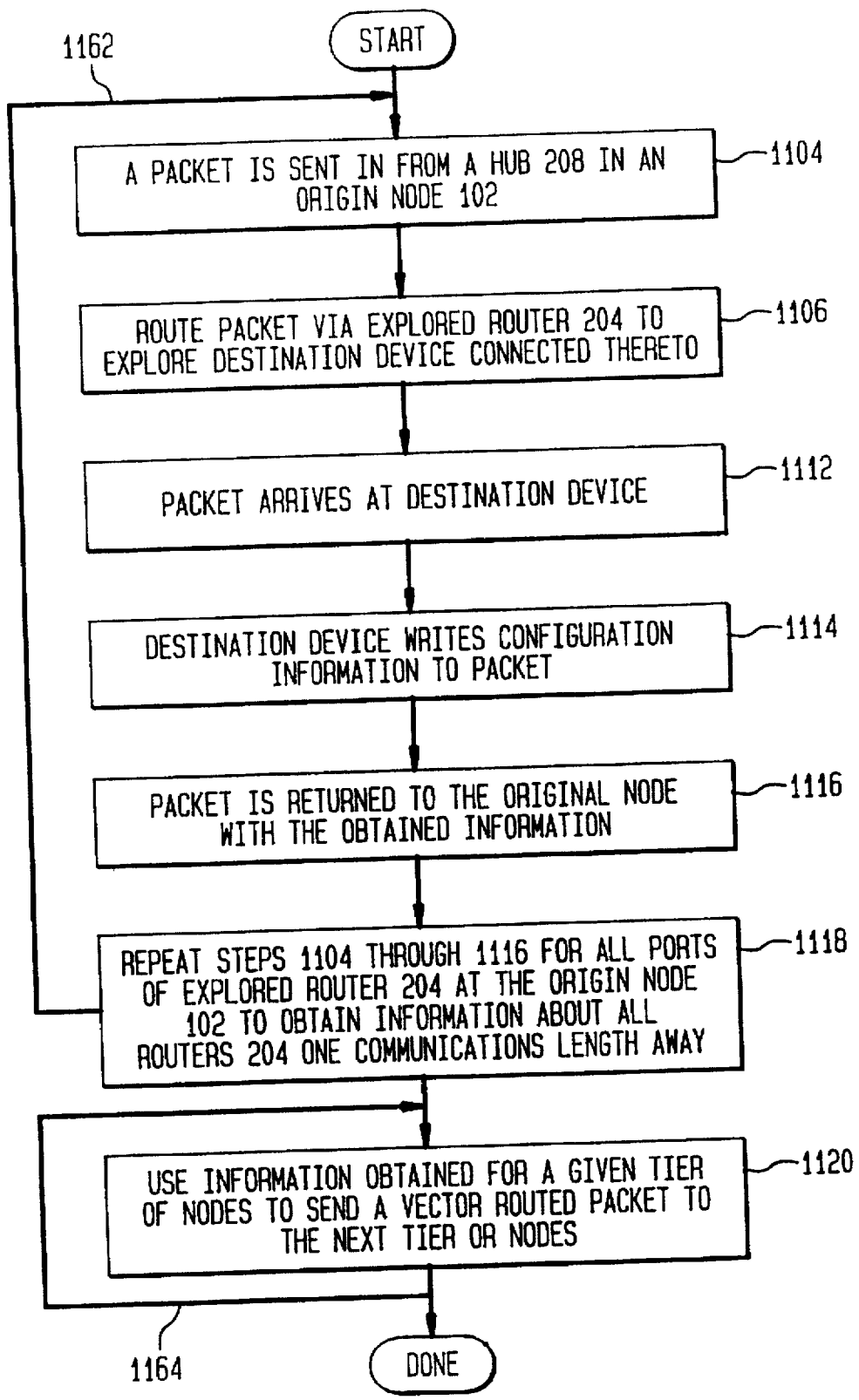
FIG. 11 is a flow diagram generally illustrating the process of network exploration according to one embodiment of the invention.

FIG. 11 is a high-level flow diagram generally illustrating the process of network exploration according to one embodiment of the invention. At the highest level, network exploration is accomplished by sending an exploratory packet from an originating device to a target device along a specific route, returning the packet to the origin along the same route. The exploratory packet gathers information about each target device.

Typically, the originating device is a processor connected via a hub 208 to a router 204 at a node 102. The node 102 at which the origin device is located is referred to the originating node 102. Similarly, the router 204 at which the origin device is located is referred to as the originating router 204.

Referring now to FIG. 11, in a step 1104, a vector-routed packet is sent in a particular direction from the originating device (e.g., an originating hub 208) to the router 204 connected thereto. The router 204 is explored and configuration information regarding this explored router 204 is returned to the origin device (as described in detail below in steps 1108–1116).

In a step 1106, the configuration information obtained about the explored router 204 is used to route vector packets through the explored router 204 to a target device connected thereto. In a step 1108, the packet arrives at the target device connected to the port from which the packet was sent. In the example topology described above, this target device can be router 204 at another node 102 or a hub 208 of the present node 102 connected to the explored router 204.

It is worth noting that in the environment of the hierarchical fat hypercube topology, the routers 204 at the metalevel only connect to other routers. In this embodiment, there are no hubs 208 at the metalevel.

In a step 1112, once the packet has arrived at the target device, the target device writes configuration information to the packet. Where the target device is a router 204, the target router 204 writes configuration information from its configuration element 1012 to the packet. The configuration information provides information pertaining to the target router. Most important to network mapping, is information pertaining to the router identification, number and identity of ports 404 that target router 204 has. Additional information can include, without limitation, a status of the ports or edges (e.g., active, failed, etc.), link utilization information and performance information.

In the environment of a hierarchical fat hypercube, the configuration information can include an indication of whether the node is a hypercube node or a metacube node (referred to as a metanode). Note, however, that this information does not have to be provided by routers 204. This information can be deduced from the other information received about the devices connected to each router. If, for example, a router is only connected to other routers (i.e., is not connected to a hub 208), it can be deduced that that router is a node of a metacube or is an unpopulated node of a hypercube. Further information about the nodes connected to that router can indicate which of these two nodes it actually represents.

If instead of being routed to a router 204, the target device is a hub 208, information pertaining to the hub is written to the packet. Such information can include, without limitation, number and type of processors connected to the hub 208, the identity of processors connected to the hub 208, and like information regarding memory size or allocation as well as I/O port information where memory and/or I/O reside at that hub as well.

In a step 1116, the packet is returned to the origin device and provides the origin device with the information obtained at the target device (router 204 or hub 208). The origin device compiles this information as information about the network. This compiled information is used by a processor (preferably, but not necessarily, the origin device) to map the network.

Steps 1106 through 1116 are repeated for each output port of originating router 204 connected to the originating device. This is illustrated by step 1118 and flow line 1162. In this manner, router and hub configuration information obtained and compiled for each router 204 or hub 208 that is directly connected to router 204 at the node 102 housing the origin device. These devices (routers 204 and hubs 208) that are directly connected to the originating router 204 are referred to as first-tier devices (i.e., first-tier routers 204 or first-tier hubs 208).

In a step 1120, the information obtained in steps 1106 through 1116 is used to send a vector-routed packet 1300 to the next tier of devices (i.e., the devices connected to the first-tier devices, exclusive of the originating router). Specifically, after configuration information is obtained for each first tier router 204, that information is used to send a vector-routed packet to obtain information regarding second-tier devices (routers 204 or hubs 208) which are connected to that first-tier router 204 (i.e., routers 204 that are one hop away from the first-tier node and hubs 208 at that first-tier node). This is accomplished by addressing a vector-routed packet to the known first-tier router 204 and out a known port 404 of the first-tier router to obtain information regarding the device connected to that port 404. This is done for each port of each first tier router 204. The information is returned to the origin node for compilation.

The information obtained regarding routers that are two hops away (e.g., second-tier routers 204) is used to route packets to third tier devices (e.g., hubs connected to a second-tier router 204 and routers 204 that are one hop away from the second-tier router 204, exclusive of the first-tier router 204 connected to that second-tier router 204). This process of using information obtained about a given tier of routers to route packets to the next tier so that information can be obtained about that next tier is repeated until information about each node 102 on the network has been obtained. This is illustrated by a flow line 1164. Note that information obtained regarding one or more routers 204 of a particular tier can be used to route packets to the next tier without having to wait for information regarding all devices at the particular tier.

Figure 12:
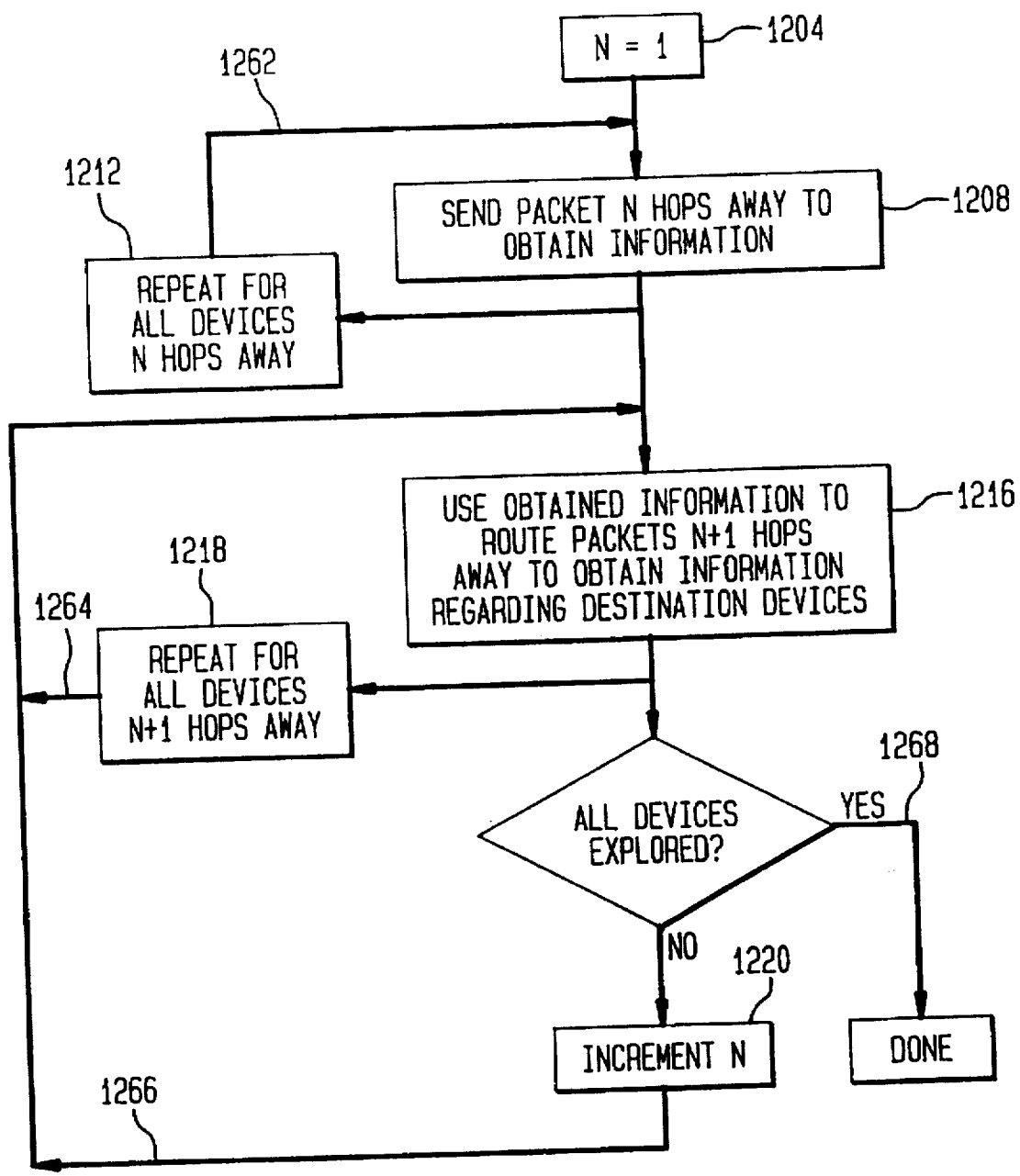
FIG. 12 is an operational flow diagram illustrating the process of obtaining information about a tier of network devices and using this obtained information to obtain similar information from a next tier of devices until the network is explored. This process is illustrated according to one embodiment of the invention.

FIG. 12 is a high-level flow diagram illustrating this process of obtaining information about one tier of devices and using this obtained information to obtain the same type of information from a next tier of devices. Referring now to FIG. 12, in a step 1204, N is initialized. N indicates the tier of the network with reference to the origin node. In a step 1208, information about an originating router 204 in an originating node 102 is used to route packets to N-tier target devices, such as routers 204 that are N hops away from the originating router 204 and/or hubs 208 that are connected to that originating router 204. Information about these target devices is gathered and returned to the origin device.

Note that in one embodiment, there is an initial step, before step 1208, of exploring the originating router 204 at the originating node, and using this information in step 1208 to explore the first tier of devices connected to this first router 204.

Step 1208 is repeated for each such N-tier target device (routers that are N hops away from originating router 204, and hubs 208 directly connected to routers 204 that are N-1 hops away from originating router 204) as illustrated by step 1212 and flow line 1262. In one embodiment, this repetition of step 1208 for all N-tier devices is accomplished by sending several vector-routed packets, one for each port 404 of originating router 204. In one embodiment, this is done with the exception of the port 404 to which the originating device is connected.

In a step 1216, the information obtained about the routers 204 that are N hops away is used to route packets to destination devices that are N+1 hops away (i.e., (N+1)-tier devices) so that information can be obtained therefrom. This step is repeated for all (N+1)-tier devices as illustrated by steps 1218 and flow line 1264. As with step 1208, this can be accomplished by repeating step 1216 for each port 404 of the N-tier routers 204 (with the exception of the input ports).

In a step 1220, N is incremented. Step 1216 is then repeated for the next tier of devices as illustrated by flow line 1266. Once all devices have been explored, the process is completed. This is illustrated by decision block 1224 and flow line 1268.

Note that as soon as information about a router 204 that is N hops away has been returned, that information can be used to route packets to destination devices that are N+1 hops away via that router 204. It is not necessary that information for all routers that are N communications lengths away be obtained before information can be obtained form devices N+1 hops away.

There are several mechanisms that can be implemented to determine when all devices have been explored. In one embodiment, a marking system is implemented to mark routers 204 for which all devices connected thereto have been explored. A preferred technique marks routers 204 and hubs 208 which have themselves been explored. Still another mechanism uses the unique router ID, gathered during exploration, to determine when exploration is complete. In yet another embodiment, a maximum number of tiers is defined such that exploration is terminated when this maximum is reached.

The above description is provided in terms of an originating device that begins and controls the exploration. In an alternative embodiment, more than one originating device can initiate and perform the network exploration. In such an alternative, when exploration is initiated (e.g., at system powerup), several processing nodes may begin the exploration. The exploration may be completed by all processors that initiated the exploration. Alternatively, some of the processors that started the exploration, may yield to one or more remaining processors to finish the exploration.

4.3 Vector Packet Configuration and Routing

Figure 13:
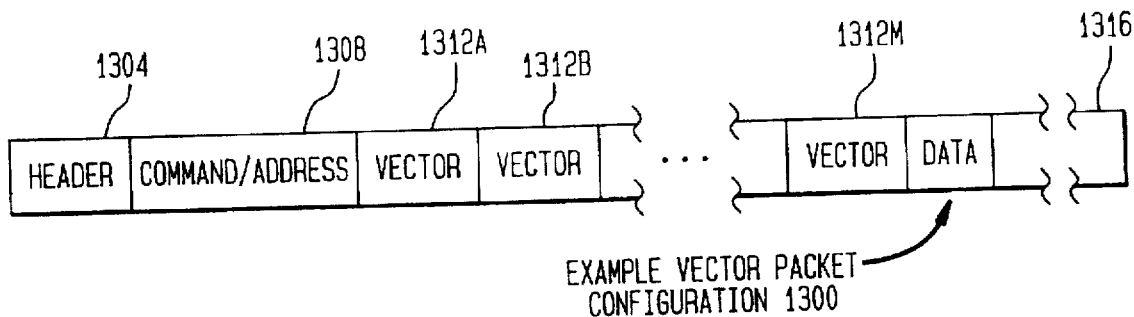
FIG. 13 is a diagram illustrating an example configuration of a vector-routed packet according to one embodiment of the invention.

A vector packet configuration is now described according to one embodiment of the invention. FIG. 13 is a diagram illustrating the vector packet 1300 in this embodiment. Vector packet 1300 is comprised of a header field 1304, a command/address field 1308, a plurality of vector fields 1312A–1312N (referred to generally as vector field(s) 1312), and a data field 1316. FIG. 13 is not drawn to scale and, therefore, the relative size of each field is not dictated by this illustration.

According to this embodiment, each vector field 1312 is of a fixed size and contains information that determines through which port 404 of a router 204 the packet will exit. The set of vector fields 1312 in the vector packet 1300 determine the transmission route followed by the vector packet 1300 from the originating device node to the target device. Each vector field determines the egress port 404 for an associated router 204 along the route. One or more vector fields 1312 are also used as an end marker to indicate when the vector packet has reached its target device.

It is important to note that the vector routing decisions used to explore the network are made based on the configuration information obtained in a previous iteration of the process. Thus, the process is not affected by a change in the number of nodes from one router to the next. In other words, because information about a given router, including its number of ports, is obtained before going to the next tier, the process can support exploration through nodes which have routers with different numbers of ports.

4.5 Packet Routing Using an Example Packet Configuration

Figure 14:
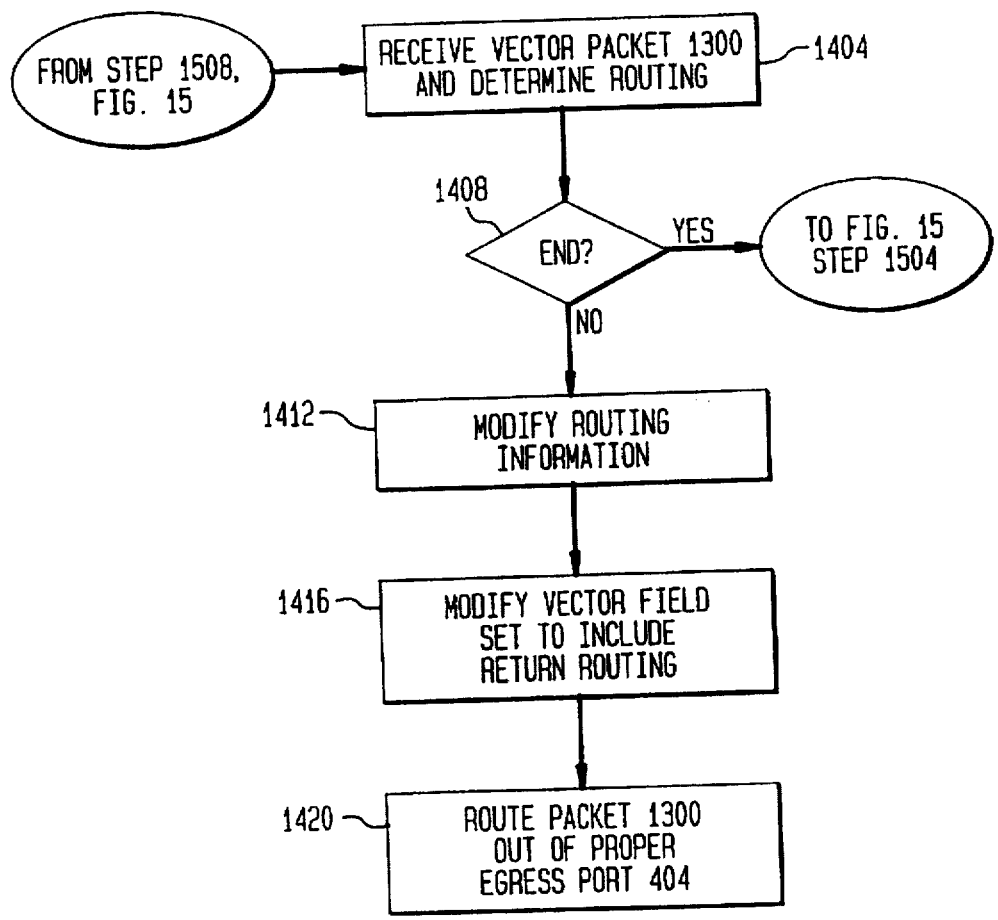
FIG. 14 is a flow diagram illustrating the process of routing vector-routed packets from an originating node to a target node According to one embodiment of the invention.

The routing of packets using the example packet configuration illustrated in FIG. 13 is now described. FIG. 14 is a flow diagram illustrating the process of routing vector packets 1300 from an origin node to a target node. This process is described in terms of the vector packet configuration described above. It will become apparent to a person skilled in the art how alternative vector packets can be implemented to route packets for network exploration.

Referring now to FIGS. 13 and 14, in a step 1404, a first router 204 receives a vector packet 1300 from an originating hub 208. First router 204 examines the routing information contained in the vector field 1312 at the head of the set of vector fields 1312 (e.g., head vector field 1312A). For the purposes of this discussion, head vector field 1312A is said to be associated with the first router 204. In one embodiment, router 204 first examines a vector flag (not illustrated) to determine whether the received packet is a vector packet or an address-routed packet As stated above, a vector field 1312 can include routing information used by the associated router 204 to determine through which egress port 404 to route the packet.

Alternatively, the vector field 1312 can be a terminating value indicating that the router associated with that vector field 1312 is at a terminating node.

Figure 15:
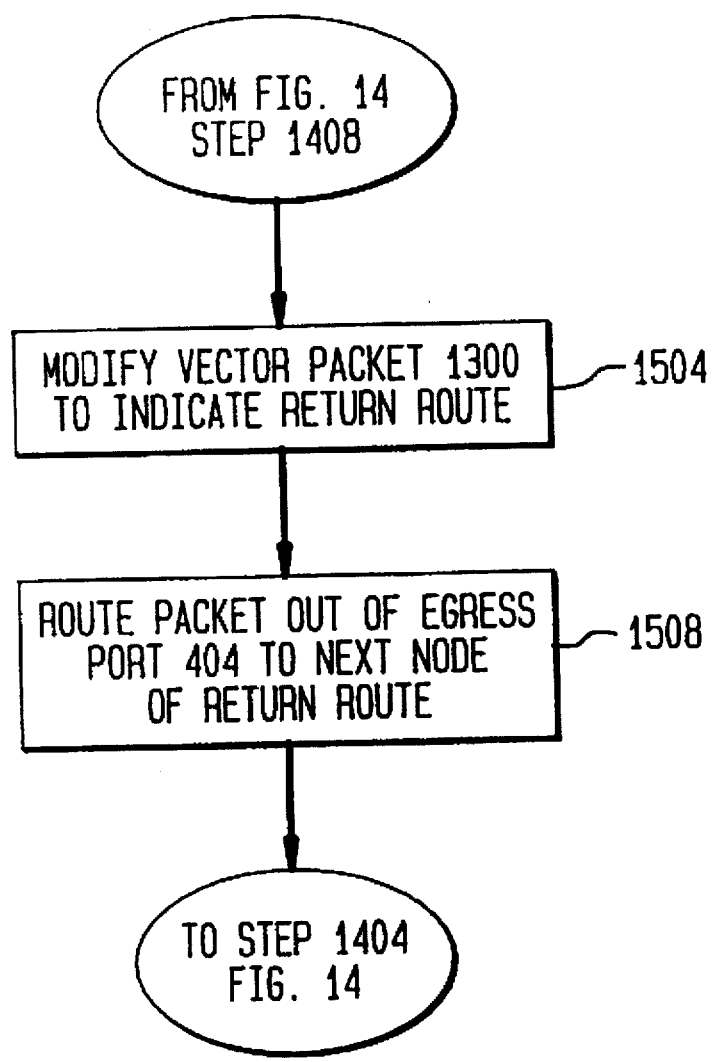
FIG. 15 is an operational flow diagram illustrating the process that occurs when a vector-routed packet reaches its target node according to one embodiment of the invention.

If the vector field 1312 indicates that the router 204 is a terminating node, the operation continues at a step 1504 in FIG. 15, as illustrated by decision block 1408 and flow line 1462. If, on the other hand, the vector field 1312 indicates routing information, the operation continues at a step 1412.

In step 1412, the associated router 204 modifies the routing information in vector packet 1300 for subsequent routing to the target node (referred to as target-route information). This modification is accomplished by removing the head vector field (i.e., vector field 1312A), and by making the next vector field 1312 (i.e., vector field 1312B) the new head vector field 1312A.

In a step 1416, the associated router 204 modifies the vector field set further to indicate return-routing information. This modification is accomplished by updating the last vector field 1312M in the set to indicate the port through which vector packet 1300 entered this router 204.

Once the vector fields are modified to update the target-route information and the return-route information, in a step 1420, the packet is routed out of the port to the next destination device as was indicated by the head vector field 1312 before this modification.

The vector packet is routed through each router 204 along the target route as described above until the target node is reached. In other words, steps 1404–1420 are repeated for each router 204 along the target route until the target node is reached. Once the target node is reached, the operation continues at FIG. 15.

FIG. 15 is a flow diagram illustrating the process that occurs once the vector packet 1300 reaches the target node. In a step 1504, if the head vector field 1312A indicates that the associated router 204 (or hub 208) is at the target node, vector packet 1300 is modified so that vector fields 1312 now indicate the return route to the origin node. Specifically, the vector fields 1312 now enable vector packet 1300 to follow the target route in reverse so that the information obtained at the target node can be returned to the origin node.

This modification can be accomplished in a number of different embodiments. According to one embodiment, the vector fields 1312 are re-ordered to indicate the return route. Specifically, the last vector field 1312M (indicating the ingress port of the previous router 204) now becomes the head vector field 1312A. To follow the route in reverse, vector field 1312A is simply the egress port of this router 204. Likewise, each subsequent vector field 1312B, et seq., that follows the head vector field 1312A indicates the egress port for each subsequent router 204 along the return route.

According to an alternative embodiment, a direction flag can be included in vector packet 1300. The flag can be set or not set to indicate whether the packet is being routed to the target or back to the origin, thus indicating the order in which to read vector fields 1312.

In yet another alternative embodiment, the target device provides vector packet 1300 with vector fields 1312 for routing the packet along both the outbound and the return routes. In this embodiment, the packet originates with additional vector fields 1312 to direct the packet back along the return route. A disadvantage of this embodiment is the additional packet overhead required to store vector fields 1312 for both the outbound and return routes (as opposed to replacing the outbound vector field 1312 with the return vector field 1312 for each router 204 along the way).

4.5 Example Routing Scenario

The network exploration process described above is now described for an example routing scenario. This description is provided in terms of the embodiments described above.

4.5.1 Target Routing

Figure 16:
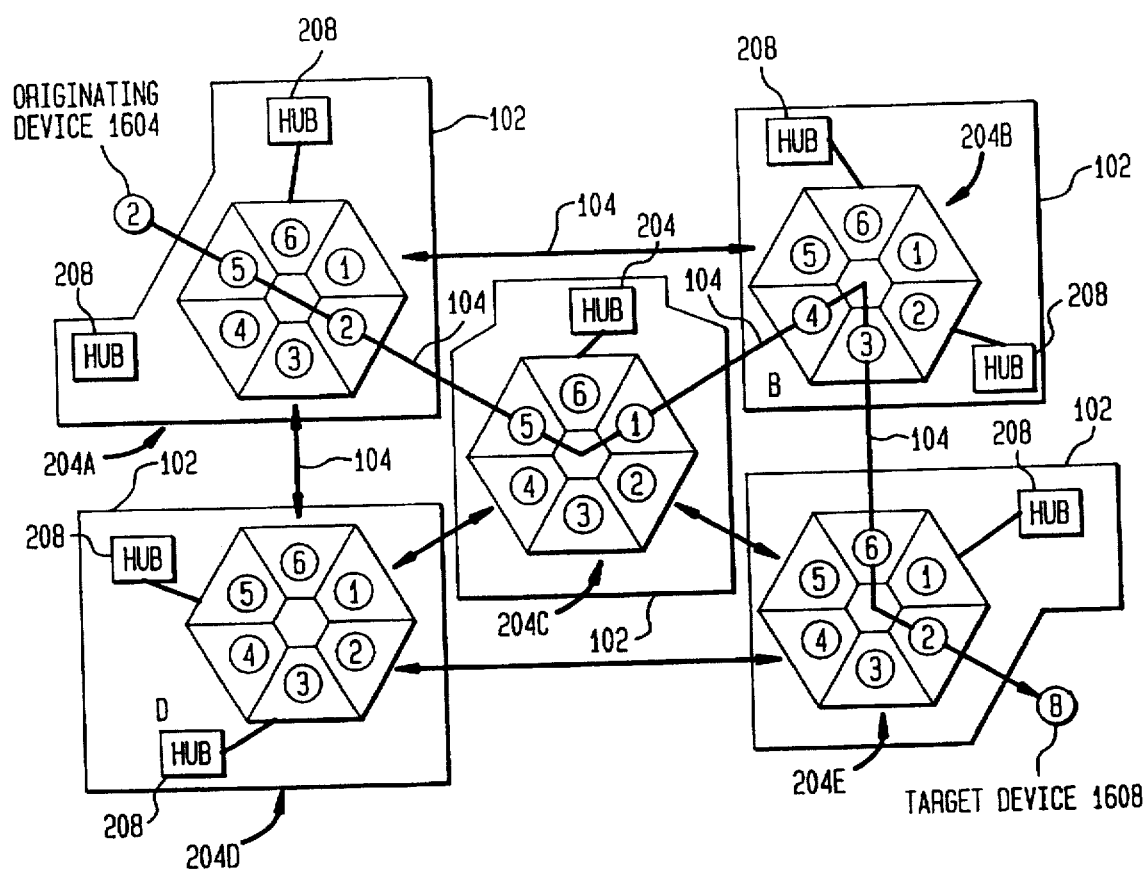
FIG. 16 is a diagram illustrating a simple network topology and an example target route from an originating device to a target device.

FIG. 16 is a diagram illustrating a small network topology and the target route from the originating device 1604 to the target device 1608 through this topology. The topology illustrated in FIG. 16 includes a plurality of nodes 102, each node 102 having a router 204 and one or more hubs 208. The nodes 102 are interconnected via edges 104.

According to the scenario, originating device 1604 is sending a vector-routed packet 1300 to target device 1608. Originating device 1604 and target device 1608 can be a node 102, or a hub 208. The route chosen by originating device 1604 is via routers 204A, 204C, 204B, and 204E, in that order.

Figure 17:
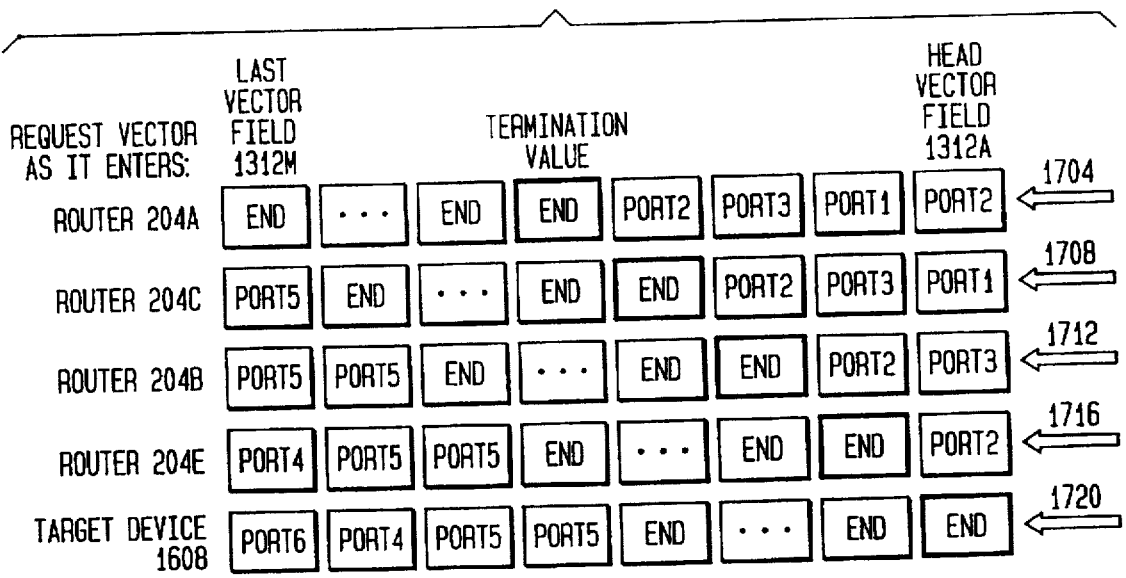
FIG. 17 is a diagram illustrating the vector fields for a vector-routed packet, routed according to the route illustrated in FIG. 16.

FIG. 17 is a diagram illustrating the vector fields 1312 for vector packet 1300 at each router 204 along the target route. The example scenario is now described in terms of FIGS. 16 and 17. Originating device 1604 sends vector packet 1300 to router 204A. Row 1604 illustrates the set of vector fields 1304 for vector packet 1300 at router 204A. At router 204A, head vector field 1312A indicates that router 204A should route vector packet 1300 via egress port 2. Router 204A removes vector field 1312A and shifts the subsequent vector fields 1312 one place forward. Router 204A then inserts at the end of the set of vector fields the identity of the port via which vector packet 1300 entered router 204A. The resultant set of vector fields is illustrated in row 1608. Router 204A then routes vector packet 1300 out of port 2 to router 204C.

Router 204C examines head vector field 1312A which now indicates that the egress port is port 1. Router 204C shifts the vector fields 1312, inserts the ingress port at the end of the set of vector fields 1312 and routes the vector packet to the next node.

This process continues, routing vector packet 1300 through routers 204B and 204E. Router 204B receives and updates vector packet 1300 as illustrated in rows 1612 and 1616, respectively, and forwards updated vector packet 1300 to router 204E. Router 204E receives and updates vector packet 1300 as illustrated in rows 1616 and 1620, respectively. Note that updated vector packet 1300 (illustrated in row 1620) now indicates the end of the route at head vector field 1312A. Updated vector packet 1300 is now sent out of egress port 2 to target device 1608.

When target device 1608 receives vector packet 1300 it reads head vector field 1312A. Head vector field 1312A indicates that the end of the target route has been reached. Therefore, target device 1608 updates the data field 1316 to include the configuration information of that device. In the case where target device 1608 is a router 204, target device 1608 updates the data field to indicate the number of ports 404 of that target device 1608, as well as other configuration information. Target device 1608 then reorders the vector fields 1312 of the vector packet 1300 to return the vector packet 1300 to the originating device 1604 via the same route.

4.5.2 Return Routing

Figure 18:
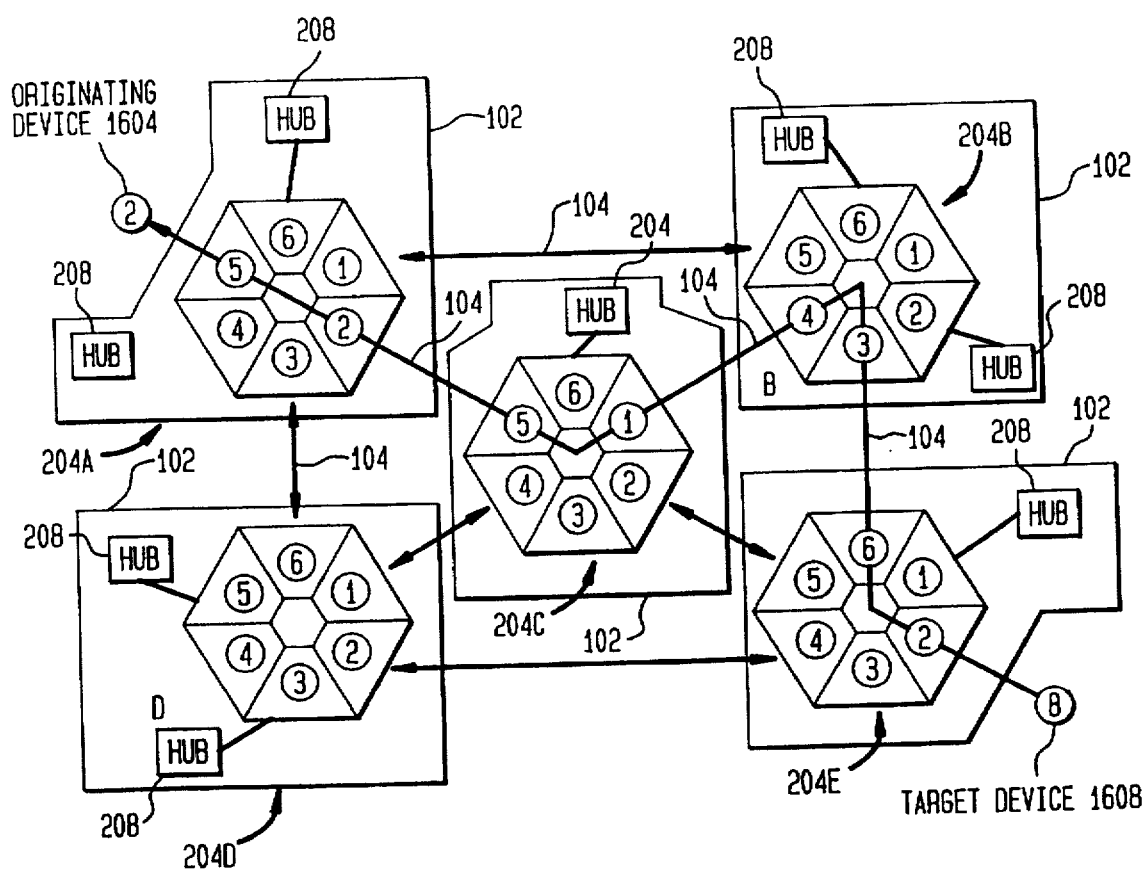
FIG. 18 is a diagram illustrating the same topology illustrated in FIG. 16 and further illustrating a return route for the vector-routed packet.
Figure 19:
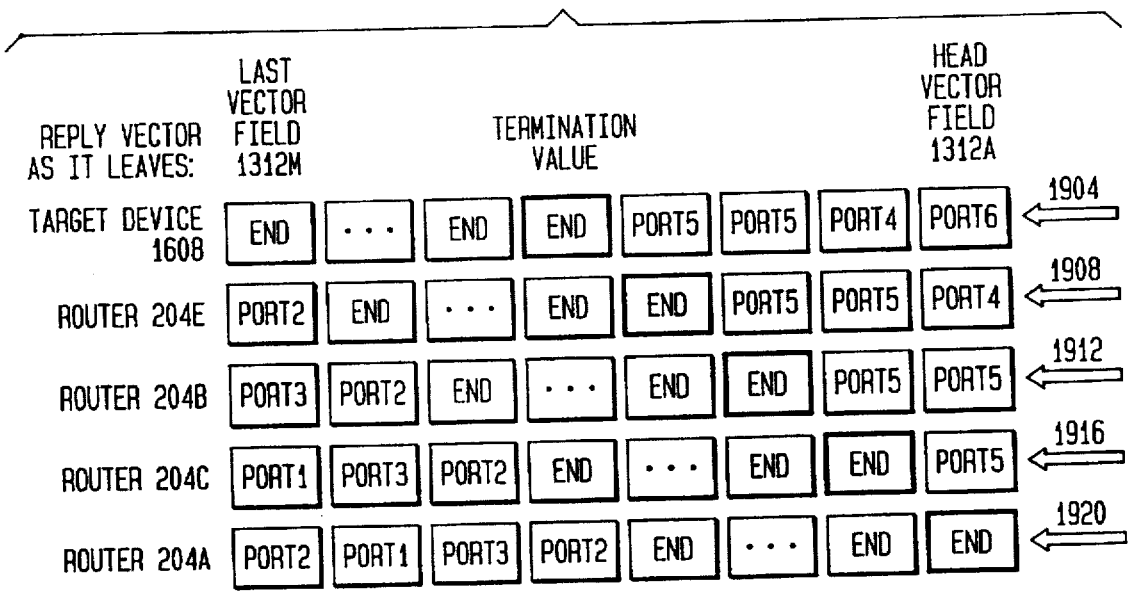
FIG. 19 is a diagram illustrating the vector fields for the vector-routed packet along the return route illustrated in FIG. 18.

The network exploration scenario described above for the target route is now described for the return route. FIG. 18 is a diagram illustrating the same network illustrated in FIG. 16 but with the route drawn in the reverse direction. FIG. 19 is a diagram illustrating the vector fields for the reordered vector packet 1300 for the return route.

Target device 1608 first returns the vector packet 1300 to router 204E. Router 204E examines head vector field 1312A and determines that vector packet 1300 should be sent out via port six. Router 204E removes vector field 1312A and shifts the subsequent fields one place forward. Router 204E then inserts at the end of the set of vector fields the identity of the port via which vector packet 1300 entered router 204E. The resultant vector fields are illustrated in row 1808. Router 204E then routes vector packet 1300 out of port 6 to router 204B.

Router 204B examines head vector field 1312A which now indicates that the egress port is port 4. Router 204B shifts the vector fields 1312, inserts the ingress port at the end of the set of vector fields 1312 and routes the vector packet to the next node, router 204C.

This process continues, routing vector packet 1300 through routers 204C and 204A. Router 204C receives and updates vector packet 1300 as illustrated in rows 1812 and 1816, respectively, and forwards updated vector packet 1300 to router 204A. Router 204A receives and updates vector packet 1300 as illustrated in rows 1816 and 1820, respectively. Note that updated vector packet 1300 (illustrated in row 1620) now indicates the end of the route at head vector field 1312A. Updated vector packet 1300 is now sent out of egress port 5 to originating device 1604.

5.0 Route Determination and Optimization

Figure 20:
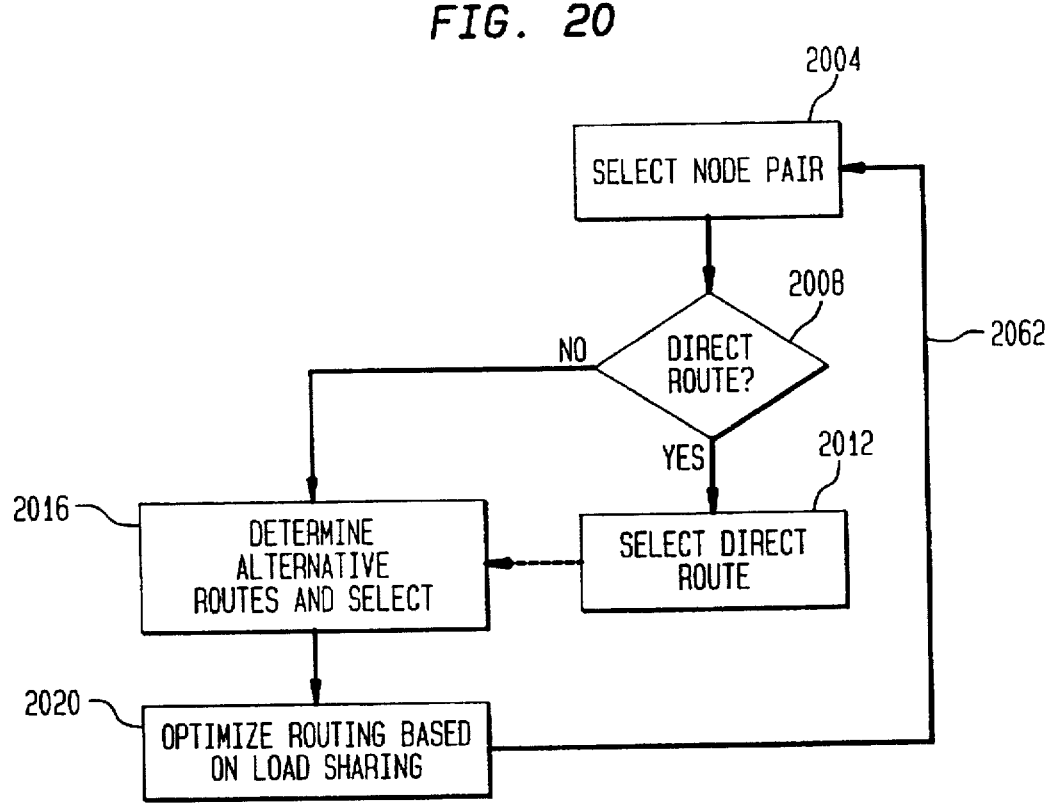
FIG. 20 is an operational flow diagram illustrating a method of selecting optimum routes for node pairs in the network according to one embodiment.

Having thus described a method for automatically exploring the network to determine the connectivity information for each node, routing determination and optimization can be performed. FIG. 20 is an operational flow diagram illustrating this process according to one embodiment of the invention.

Referring now to FIG. 20, in a Step 2004, a node pair is selected for which routing information is desired. That is, an originating node 102 and a target node 102 are selected so that a route in between those two nodes 102 can be determined.

In a step 2008, it is first determined whether there is a direct route between the selected pair of nodes 102. That is, it is determined whether the two nodes 102 are directly connected by a single edge 104. If there is a direct, single connection, in a step 2012, this direct route is selected. If there is no direct route between the pair of nodes 102, various alternative routes are determined using the connectivity graph. In a Step 2016, these various routes are compared and the optimum route is selected. In most cases, the optimum route is simply the shortest route between the node pairs (i.e., the route with the fewest hops). In fact, in one embodiment, the shortest route is chosen by default. If there is more than one shortest route between the node pair, the actual route selected can be chosen at random or a route can be chosen which is most likely enhance load sharing and to minimize the potential for bottlenecks In one embodiment, the determination is made at this step based solely on the communications length, and any optimization based on load sharing is performed after all initial routing decisions have been made (as illustrated by a step 2020, below). In an alternative embodiment, route determination for each node pair takes into consideration load sharing based on whatever routing information is currently available (i.e., based on routes already determined for other node pairs). In this alternative, a final optimization (step 2020) can still be performed after routes have been determined for all of the node pairs. In either case, routing can be optimized to minimize traffic jams as the routing determination is made.

As illustrated by flow line 2062, this process is repeated so that optimum routes can be determined between each node pair. It is interesting to note that the process does not necessarily have to be repeated for each node pair because node pairs which are within an already determined route have, by default, had routes determined therefore. For example, if a route between a given node pair is for communications lengths, there are five nodes 102 which make up that route. Among these five nodes 102 are ten distinct node pairs. The original route determined through these nodes 102 can used to determine the appropriate route for each individual node pair. That is, the route for each node pair is a subset of the original route.

In step 2020, the routes determined are analyzed and, if necessary, rerouting is preformed to optimize the network. If, for example, one or more edges 104, or series of edges 104, are used heavily by the selected routes, these routes can be rerouted to less used edges 104. Ideally, the routes selected for rerouting are those which have alternative routes that are no longer than the original routes selected. In a preferred embodiment, the optimization Step 2020 is performed after routes have been selected for all of the node pairs. In this manner, the best determination can be made regarding rerouting of any determined routes.

In an alternative embodiment, route selection between the various node pairs of the network can be accomplished during network exploration. During exploration, when a vector-routed packet 1300 is sent to a target node 102, it brings back information regarding that target node 102. In this embodiment, when a packet is sent to a target node 102 along a specific route and returns with the target ID, that route is used as the chosen route between that node pair (i.e., between that origination node 102 and target node 102). Additionally, for each pair of nodes along this route, the path followed between each interim pair is chosen as the route for that node pair. The routes are then stored in a table and can be indexed based on the node pair. Each time a vector-routed packet 1300 returns with new routes between node pairs, the new routes are compared to any already-defined routes. If no already defined route exists, the returned route is designated as the selected route for that node pair. If, on the other hand, a route has already been defined for that node pair, the two routes are compared and the optimum chosen.

As with the embodiment described above with respect to FIG. 20 the routing paths chosen in this alternative embodiment can be optimized to re-select routes for load sharing. To facilitate this optimization, in one embodiment, alternative routes are saved for each node pair. In this embodiment, if, during the optimization process, the route chosen is through a high traffic area, the alternative routes are investigated to determine if one of those alternative routes would be preferable. Note that the preferable route selected is one that does not result in a loop. Therefore, during optimization, routes are examined to ensure that they are free of loops.

One way to implement the connectivity graph is to store all of the obtained configuration information in a relational database. In such a database, each router ID could be listed along with its associated output ports and the router 204 connected to each port. With such a database, the system generating the routes could identify each node pair by locating the router IDs for the routers 204 associated with the nodes in the pair and use the information in the table to determine the preferred route.

6.0 Programmable Distributed Network Routing

Once the routing between node pairs has been determined, either manually or automatically, a programmable, distributed network routing scheme is used to route messages between the node pairs. This is accomplished by using programmable routing tables which are distributed throughout the network. The routing tables are programmed to route messages to the target device by the preferred, or designated, route. When a message is injected into the network for delivery to a particular node 102, each router 204 along the path taken by the message consults its routing table and sends the packet along the preferred route. Specifically, each router examines a target address in the message header, and uses the address to index to a table entry. The table entry indicates the port 404 out of which to route the message. In this description, the routing of messages is specifically described in terms of routing packets.

In a preferred embodiment, the router tables 2104 (illustrated in FIG. 21) contained in each router 204 are organized in a hierarchical fashion. That is, for nodes 102 that are near the subject router 204, a specific local table entry exists that indicates the egress port 404 to use to reach the target node 102 via the preferred route. For nodes 102 which are more distant, several nodes 102 will share a single remote table entry. In one embodiment, the nodes are divided into groups. Routing among nodes 102 within a group is performed using the local table entries. Inter-group routing (routing to a node in a different group) is performed using the remote table entry. The table entry is the same for each node 102 in a group of remote nodes 102.

For example, in a hierarchial fat hypercube topology as described above in Section 2, a local table (2404 illustrated in FIG. 24) exists in each router 204. The local table 2404 in a node 102 contains addresses to target nodes 102 within the same n-dimensional hypercube.

However, for destinations across the meta-level in a different n-dimensional hypercube, only a general routing for that n-dimensional hypercube is provided by the router table. That is, the address for each node 102 in that n-dimensional hypercube indexes the same entry in the second level of hierarchy, the metatable (2408 illustrated in FIG. 24). It is not until the packet reaches the specific n-dimensional hypercube in which its target-node resides that the local address table is used for routing that packet.

This hierarchical structure allows router tables to be designed in such a way that a table entry is not required for each node 102 on the network. Instead, there is one table entry required for each node in the immediate vicinity (i.e., each node within the current router's 204 local n-dimensional hypercube, and one entry for each n-dimensional hypercube connected to the metacube (i.e., each metacube node). However, it is not necessary that an entry for each node in each of the other metacube nodes be provided.

An important feature of distributed routing according to the present invention is that the router tables (2104) contained in each router 204 are software programmable and are programmed when the routing is determined. Thus, for a variety of network topologies, software can be used to program the router tables to perform an efficient, deadlock-free path between every pair of nodes 102 in the network. Because this can be a difficult and time consuming task, it is more practical to have software program the router tables than to have the hardware attempt to route the packets dynamically, as is done in some conventional networks.

A further feature of distributed routing that stems from the software programmability of the router tables 2104 is that the router tables 2104 can be easily reconfigured. If a fault occurs in the network requiring a change in the routing of packets, the router tables can be updated to implement the alternative paths selected between the affected node pairs. Additionally, if the network is reconfigured or expanded, the existing router tables can be reprogrammed by software to accommodate the new configuration and/or the additional nodes.

A further feature of the distributed routing is that in one embodiment it provides a pipelined routing process in which routing information for the next router 204 is determined while the packet is being routed through a current router 204. Thus, when the packet reaches the next router 204, the routing process in that next router 204 can begin without having to wait for the routing information to be determined. This feature expedites the routing process by deserializing the routing operation. When a new packet arrives at a router 204 (i.e., current router 204), this packet contains in its header egress port 404 information for this current router 204. As the current router 204 arbitrates for the egress port 404, it also accesses the router table 2104 in parallel to determine the egress port 404 for the next router 204. Therefore, the table look-up determines the egress port ID for the next router 204, as opposed to the egress port ID of the current router 204. This egress port ID for the next router is merged into the packet header as the arbitration for the egress port 404 of the current router 204 is completed and the packet is routed to the next router 204.

There have been many conventional solutions to the problem of network routing in a multi-processor environment. Many of these conventional solutions rely on router switches without tables and route via a simple destination/address comparison. These solutions do not provide the flexibility of programmable router tables nor do they provide the speed of pipelined routing determination. Other conventional techniques use a hardware adaption mechanism which tends to require complex decisions which are not easily and quickly executed in hardware. Additionally, these conventional hardware solutions at times produce non-deterministic results, which are undesirable.

Another class of conventional algorithms requires the originating node to build a set of directions in the header to route the message. Unfortunately, this uses additional network bandwidth and requires source nodes to have precise network information.

6.1 Router Configuration

Figure 21:
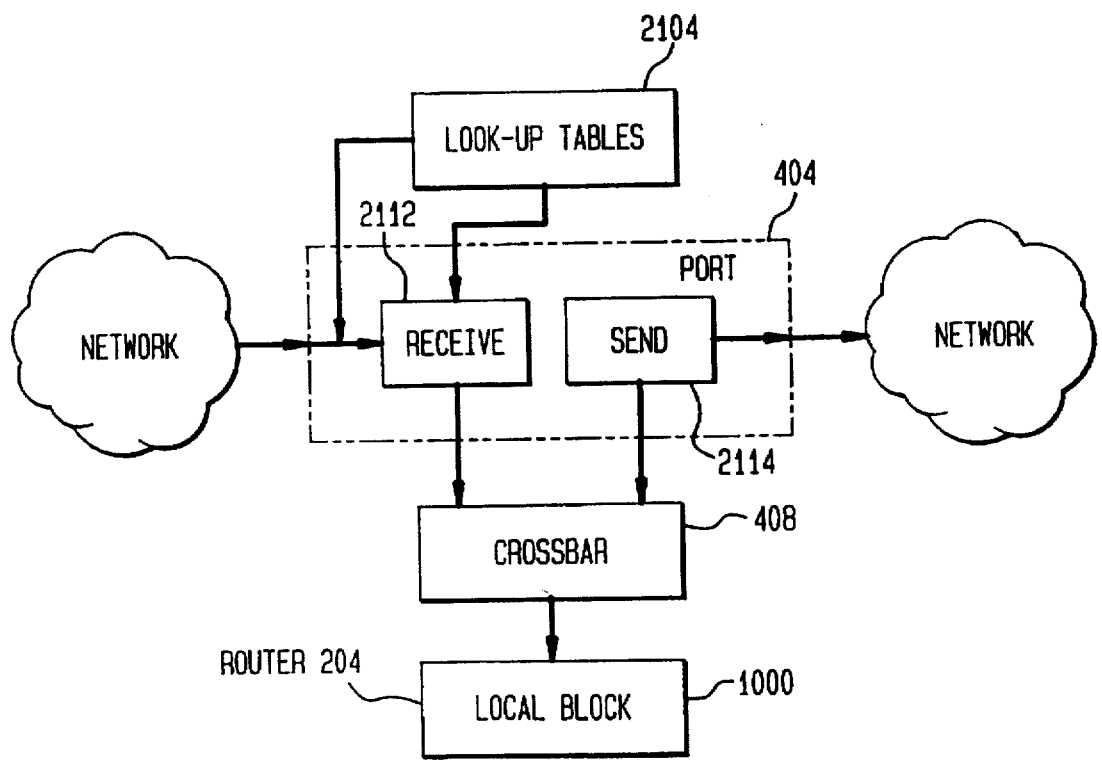
FIG. 21 is a block diagram illustrating an example router configuration according to one embodiment.

Before describing a process of programmable distributed network routing according to the invention, an example router architecture is defined. FIG. 21 is a block diagram illustrating such an example router configuration. As described above with reference to FIG. 4, each router includes a plurality of ports 404 (one illustrated in FIG. 21) and a crossbar 408 for interconnecting the plurality of ports 404. Also included in router 204 is local block 1000. As described above, local block 1000 includes the structure required to perform network exploration as described above in Section 4 of this document. Note that for an embodiment where network exploration is performed manually, local block 1000 is not necessary for programmable distributed routing.

Additionally, router 204 includes router tables 2104 which are comprised of the software programmable router tables used to determine routing information based on the network address. Additionally, each port 404 in router 204 includes receive circuit 2112 and a send circuit 2114 to communicate with other devices on the network. Although description of router 204 is provided in terms of this architecture, it will become apparent a person skilled in the relevant art how alternative, physical architectures can present the same functionality and be implemented in accordance with the invention.

6.2 Pipelined Routing

Figure 22:
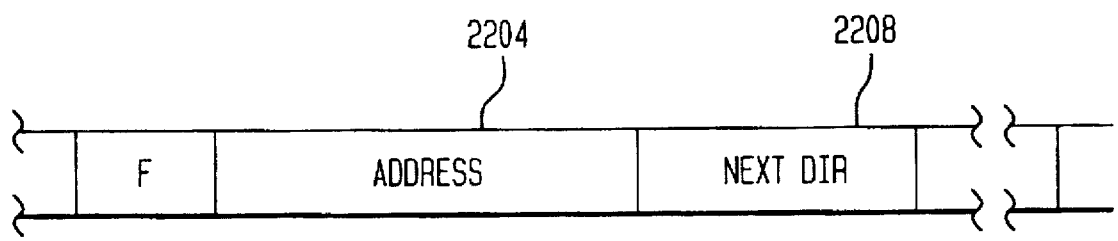
FIG. 22 is a diagram illustrating fields for an example header of a packet according to one embodiment.

As stated above, a feature of the programmable distributed network routing according to the invention is that the routing is a pipelined process that deserializes the operation of the router 204. FIG. 22 is a diagram illustrating a portion of a header used to route a packet across the network in a pipelined fashion. The header includes an address 2204 and a egress port ID 2208. Egress port ID 2208 is information that is used by the router 204 when it receives the packet to determine out of which port 404 to route the packet. Specifically, next direction field specifies the egress port 404 via which the packet is to be routed.

Address 2204 is the final address of the destination of the packet. Address 2204 is also referred to as the destination ID of the destination device. The router 204 that is currently routing the packet (current router 204) uses the egress port ID 2208 to select the appropriate egress port 404 for current router 204. Current router 204 applies the destination address 2204 to router table 2104 to determine the appropriate egress port 404 for the next router 2204. This process is described in more detail with reference to FIG. 23.

Figure 23:
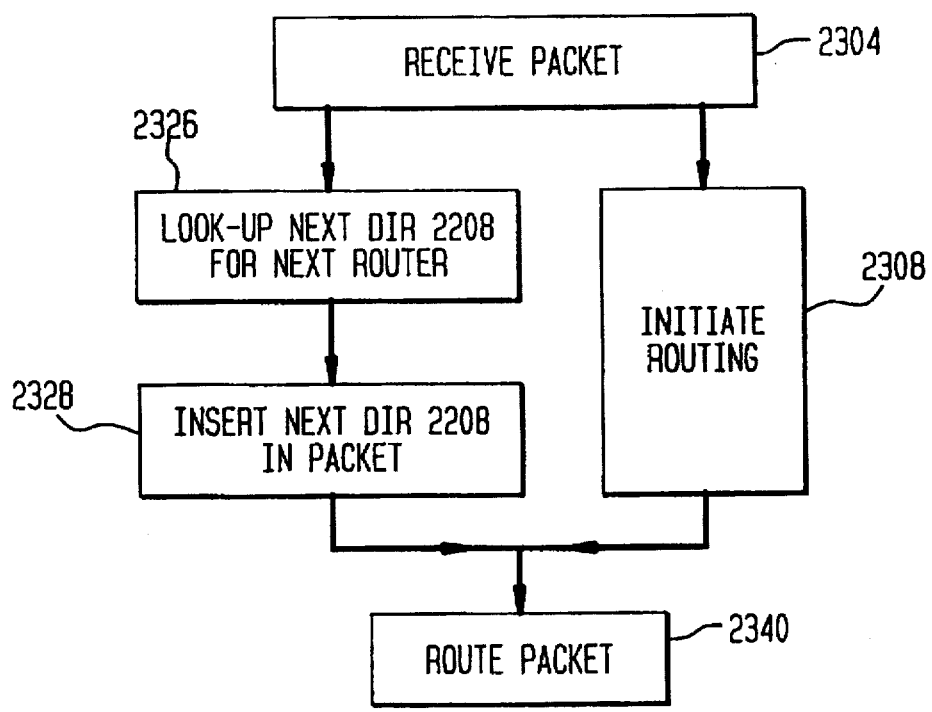
FIG. 23 is an operational flow diagram illustrating pipelined routing according to one embodiment.

Referring now to FIG. 23, in a step 2304, a router 204 packet receives packet being sent along a preferred route to a destination device. This router is referred to as current router 204. In a step 2308, current router 204 initiates the routing process required to route the packet out of an appropriate egress port 404 to the next node 102. This process includes reading the egress port ID 2208 to determine the appropriate egress port 404 of current router 204, and arbitrating for the use of that egress port 404.

At the same time that the routing process is initiated, current router 204 applies destination address 2204 to router tables 2104 to determine the egress port ID 2208 for the next router 204 that is receiving the packet from current router 204. This occurs in a step 2326.

In a step 2328, the value obtained from router table 2104 is inserted in the header of the packet as egress port ID 2208 before the packet is routed out of port 404. In a step 2240, the packet is then routed out of proper egress port 404 to the next node 102 along the route. Step 2308 is illustrated as being in parallel with steps 2326 and 2328 to illustrate that these operations can occur in parallel.

6.3 Router Tables

As stated above, when a packet is received by a router 204, that router 204 runs the address 2204 through a router table 2104 to determine the ID that defines the output port 404 for the next router 204. Because each router 204 can have several ports 404, the next router 204 to receive and route the packet can be one of the several routers connected to the current router 204. Therefore, each router 204 actually includes several router tables 2104, one for each neighboring router 204.

Figure 24:
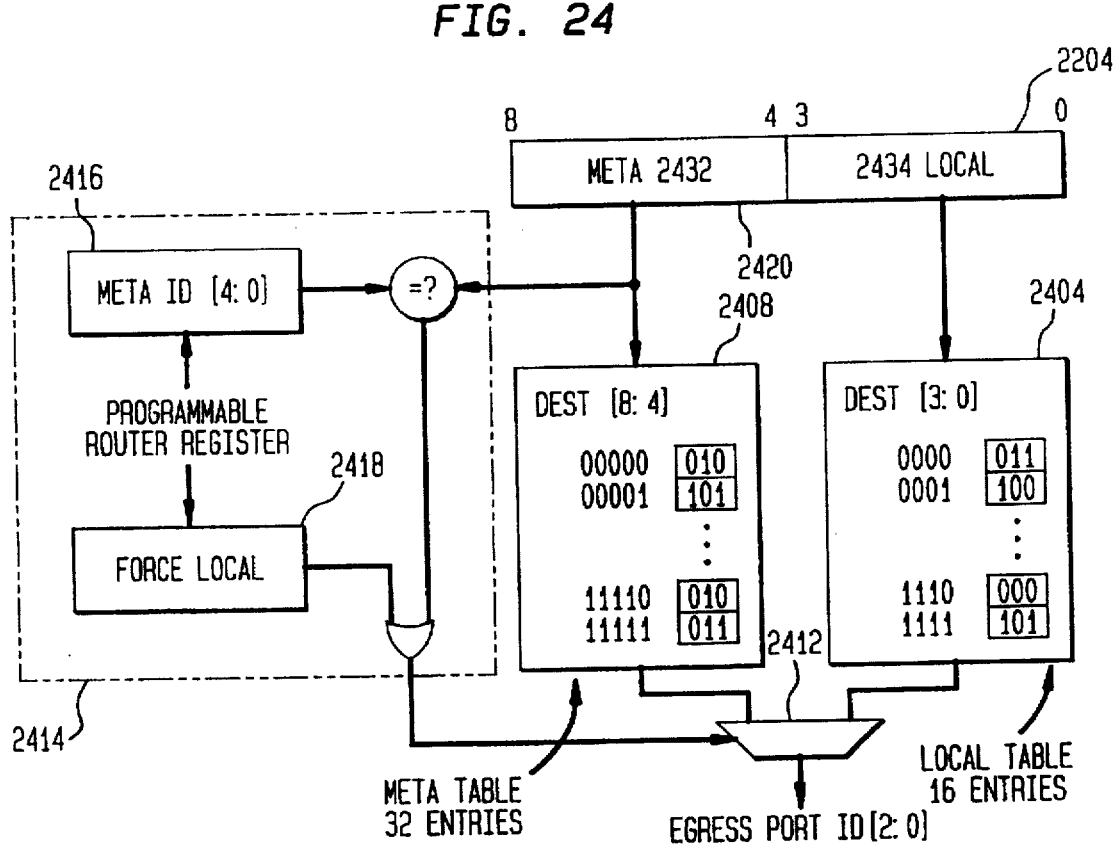
FIG. 24 is a diagram illustrating an example architecture of a router table according to one embodiment.

FIG. 24 is a diagram illustrating an example functional architecture of a router table 2104. The architecture illustrated in FIG. 24 is a hierarchical structure according to the preferred embodiment which includes two tables, one for local entries and one for remote entries. Note that for smaller network configurations or certain non-hierarchical topologies, this hierarchical structure need not be present in router table 2104.

Referring now to FIG. 24, look-up table 2104 is comprised of a local table 2404, a meta table 2408, a MUX 2412 and a local/meta determination circuit, referred to as comparison logic 2414. Table 2104 can also include a latch 2420 for latching address 2204 from the packet header.

In the hierarchical embodiment, address 2204 is divided into two sections: a meta address 2432 and a local address 2434. In this embodiment, the entire address 2204 defines the actual destination device (e.g., node 102 or hub 208) address. The high-order bits of address 2204 (i.e., the meta address 2432) define in which portion of the network the destination device is located. The low-order bits (local address 2434) define the actual device within the local area. For the hierarchical fat hypercube topology described in Section 2 of this document, meta address 2432 specifies in which of the plurality of n-dimensional hypercubes the destination device resides (i.e., in which metanode). The local address 2434 is the actual node 102 within that specified n-dimensional hypercube.

The hierarchical embodiment just described provides two-level addressing: a meta address 2432 and a local address 2434, for two levels of hierarchy. In alternative hierarchical embodiments, additional levels of hierarchy can be accommodated. In such embodiments, destination address 2204 is provided in more sections and additional tables (i.e., local, meta, etc) are provided to encompass the additional levels.

Comparison logic 2414 is used to determine whether the destination device is local (within the same n-dimensional hypercube as router 204) or whether the destination device is in another n-dimensional hypercube.

As stated above, in the hierarchical embodiment there are two individual tables within each router table 2104. The local table 2404 provides routing information assuming the destination device is a local device. Meta table 2408 provides routing information for the situation where the destination device is not a local device When the meta address 2432 portion of address 2204 matches the meta cube address of the current router 204, the local router table 2404 is used to determine the next direction. This is because the destination device exists within the current n-dimensional hypercube. If, on the other hand, the meta address 2432 does not match the meta address of the current router 204, the meta table 2408 is used to determine the address. This comparison is accomplished in one embodiment using comparison logic 2414. Comparison logic 2414 compares the meta ID of the current router 204 provided by register 2416 with the meta address 2432. If the comparison is true, a select signal is asserted at MUX 2412 to select the local table entry addressed by local address 2434. If the comparison is false, MUX 2412 selects the destination address indexed by meta address 2432. The entry selected by MUX 2412 is written to the egress port ID field 2208 of the packet before the packet is routed out of the current router 204.

A force-local register 2418 can also be provided such that the routing determination can be forced to be made on a local basis if so desired. Note that the current router meta address register 2416 and the force-local register 2418 are both software programmable.

As stated above, in the hierarchical environment, local table 2404 and metatable 2408 are provided to provide two levels of addressing to more effectively utilize table space. In an alternative, non-hierarchical embodiment, only local table 2404 is provided. In this alternative embodiment, each destination has an associated table entry in local table 2404 and there is no need for metatable 2408. This alternative embodiment is especially well suited to relatively small, non-hierarchical network topologies.

In an alternative embodiment, configuration logic 2414 can be omitted and replaced with an alternative structure. In this alternative embodiment, when meta table 2408 is programmed, the entry corresponding to the meta address of the current router 204 is filled with all zeros. In this embodiment, the output bits of meta table 2408 are provided through an OR gate to select line of MUX 2412. Thus, if meta address 2432 indicates the meta address of current router 204, the local table entry 2404 is selected. Note that in this embodiment, "all zeros" cannot be used as a router address for egress port ID 2208. This results in an extra bit being required for the table entries in implementations where the number of metanodes is an even power of two. Also note that this embodiment requires additional time to determine whether to use the local or meta entry as compared to the embodiment that uses configuration logic 2414.

Figure 25:
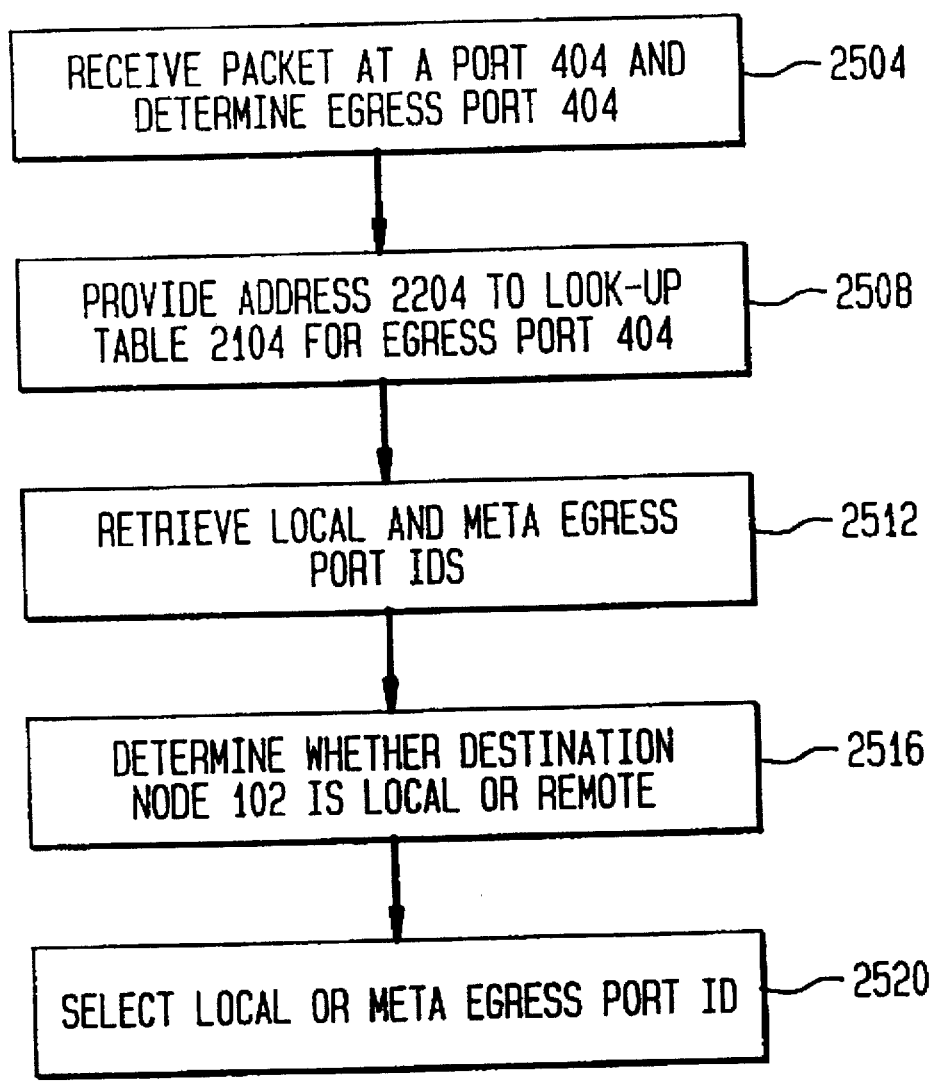
FIG. 25 is an operational flow diagram illustrating a packet routing according to one embodiment.

FIG. 25 is an operational flow diagram illustrating the operation of pipelined table look-up according to one embodiment of the invention. In a step 2504, router 204 receives the message packet at receiver 2112 of one of its ports 404. Receiver 2112 determines the egress port 404 via which the packet is to be routed and initiates the routing process. The determination of the egress port 404 is made by reading the egress port ID 2208 from the packet header.

In a step 2508, current router 204 provides the destination address 2204 to the particular router table 2104 that is associated with the egress port 404 determined in step 2504. Because there are numerous egress ports 404, and further because there is a device connected to each port 404, the appropriate router table 2104 must be selected.

In a step 2512, address 2204 is applied to local table 2404 and meta table 2408 in the appropriate router table 2104 to determine the next router egress port ID for the packet. In a preferred hierarchical embodiment, meta address 2432 is provided to meta table 2408 and local address 2434 is provided to local table 2404 so that both the local egress port ID and meta-egress port ID can be retrieved at the same time.

In a step 2516, look-up table 2104 determines whether destination node (identified by address 2204) is a local node 102 or a remote node 102. As stated above, this can be accomplished using configuration logic 2414, and this step can be performed in parallel with step 2515. Also, as noted above, there are alternative techniques for determining whether the destination device is a local device or a device in a remote hypercube.

In a step 2520, the appropriate egress port ID (local or meta) is selected and written as the new egress port ID 2208.

6.4 Router Table Sealability

Note that FIG. 24 further illustrates the look-up table for a specific scaling factor. Specifically, local table 2404 includes 16 entries addressable by the four least significant bits of address 2204. Thus, in one embodiment, each local hypercube can have 16 nodes 102. In the case of the hierarchical fat hypercube topology, each first-level hypercube can be a four-dimensional hypercube. Likewise, meta table 2408 is shown as having 32 entries addressed by the five most significant bits of address 2204. Thus, this table would support up to 32 meta nodes. Further note that in the illustrated embodiment, each entry for both the local table 2404 and meta table 2408 is three bits. Thus, this configuration would support 8-ported routers.

In an alternative embodiment, an egress port ID 2208 of all zeros is reserved to indicate that the packet is a vector-routed packet 1300. In this embodiment, when the current router 204 receives a packet having an egress port ID 2208 of all zeros (or some other designated ID value), that router 204 begins arbitrating for local block 1000. The packet is then provided to local block 1000 (via crossbar 408) where it is routed according to the network exploration routing scenarios described above. In this alternative embodiment, an additional entry in local table 2404 is reserved for this egress port ID 2208. Thus, four bits are required to provide egress port IDs 2208 for eight-ported routers 204.

Note that in a preferred embodiment, four bits are provided for local table entries even where six-ported routers 204 are used. This is to support future expandability so that existing six-ported routers 204 can be hooked up to routers 204 of larger size (e.g., 12-ported routers 204) while maintaining packet-header compatibility. Note that when such expansion occurs, router tables 2104 in six-ported routers 204 are simply reprogrammed to include entries for the twelve ports of each 12-ported router to which they are connected.

The configuration illustrated in FIG. 24 is now described in terms of the hierarchical fat hypercube topology. As stated above, the illustrated configuration could support up to 32 meta nodes where each meta node is a 16-node (4-dimensional) hypercube. Thus, a total of 512 (32*16) could be supported using this table. Note that because of the hierarchical structure implemented, all that is required is a total 48 entries for router table 2104. In contrast, if router table 2104 were implemented in a non-hierarchical fashion, 512 entries would be required to support a 512 node network. Thus, the hierarchical configuration of look-up table 2104 results in a significant savings of both hardware and look-up time.

Further, note that the scale of look-up table 2104, as illustrated in FIG. 24, is provided for illustration purposes only. Look-up table 2104 could be scaled to optimally support any number of nodes in a standard or a hierarchical topology. For example, for a hypercube topology where the first level is implemented using three-dimensional hypercubes and the second level is a two-dimensional meta cube having four meta nodes, the total number of nodes in the network is 32. In such a configuration, local table 2404 would require three address bits to uniquely identify each of the eight nodes of the three-dimensional hypercubes. Meta table 2408 would only require two address bits to uniquely identify each of the four meta nodes at the meta level. Note, however, that it would be advantageous to provide additional addressing capability so that the routing table can support future expansion.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A distributed routing system for routing messages along a preferred route in a multi-node network, comprising:

a plurality of routers distributed among the nodes of the network, each router having a plurality of ports, said ports having routers connected thereto, wherein a message is received by a current router via one of said plurality of ports and sent along a preferred route to a next router via a second one of said plurality of ports; and each router comprising a router table associated with each said port out of which a message can be routed to a next router, each said router table comprising means for determining a port of said next router out of which to route said message, wherein said determination is made based on a destination address of said message.

2. The distributed routing system of claim 1, wherein said router table comprises:
a first table having a plurality of first entries, each first entry identifying one of said plurality of ports of said next router out of which said message is to be routed;
wherein said destination address of said message is applied to said first table to select the appropriate one of said plurality of first entries that corresponds to said destination address to route said message to said next router along the preferred route.

3. The distributed routing system of claim 2, wherein the network nodes are divided into two or more groups of nodes, and wherein said router table further comprises:
a second table having a plurality of second entries, each second entry identifying one of said plurality of ports of said next router out of which said message is to be routed;
wherein said destination address of said message is applied to said second table to select the appropriate one of said plurality of second entries, and wherein each said second entry corresponds to a plurality of destination addresses that each address a node within a single one of said two or more groups of nodes; and
means for selecting one of said plurality of first entries where said destination address identifies a destination that is in the same group of nodes as said current router and for selecting one of said plurality of second entries where said destination address identifies a destination that is in a different group from said current router.

4. The distributed routing system of claim 3, wherein said router table further comprises means for determining whether said destination address indicates a destination for said message that is in the same group of nodes as said current router.

5. The distributed routing system of claim 1, wherein each of said means for determining a port of said next router out of which to route said message comprises:
means for retrieving one of a plurality of entries from said router table, wherein said retrieved entry comprises a next egress port ID that identifies said port of said next router out of which to route said message, and wherein said entry is retrieved based on a destination address of said message received by said current router; and
means for inserting said next egress port ID into said message as a current egress port ID for said next router before said message is routed to said next router.

6. The distributed routing system of claim 5, wherein each of said plurality of routers further comprises:
means for reading said next egress port ID from said received message said read next egress port ID indicating a specific one of said ports out of which to route said message;
means for initiating a send process for said indicated port while said means for determining determines said next egress port ID for said next router.

7. The distributed routing system of claim 6, wherein said means for initiating a send process comprises means for arbitrating for said indicated port.

8. The distributed routing system of claim 2, wherein said plurality of first entries are written to said first table when the multi-node network is configured, and said plurality of first entries are further updated by when the network configuration changes.

9. A hierarchical distributed routing system for routing messages along a preferred route in a multi-node hierarchical network to a destination node designated by a destination address, where the hierarchical network comprises a plurality of groups of nodes connected together at a metalevel, comprising:
a plurality of routers to route messages from a current router in a first node to a next router in a second node along the preferred route, wherein each router comprises a plurality of ports;
a hierarchical router table for each current router, said hierarchical router table comprising
a first table having a plurality of first entries, each said first entry identifying one of said plurality of router ports out of which said message is to be routed wherein said first entries correspond to a destination node that is within the same group of nodes as the router in which said first table resides; and
a second table having a plurality of second entries, each second entry identifying one of said plurality of router ports but of which said message is to be routed, wherein each said second entry corresponds to a plurality of destination addresses that each address a node within a single one of said plurality of groups of nodes;
wherein said pluralities of first and second entries each correspond to an egress port in the next router out of which said message is to be routed to follow the preferred route to the destination node.

10. The hierarchical distributed routing system of claim 9, further comprising means for determining whether the destination node is in the same group of nodes as the current router and for selecting an appropriate entry from said first and second table based on this determination.

11. A method for distributed routing of messages in a multi-node network comprising a plurality of routers, the method comprising the steps of:
receiving a message in a current router, the message comprising a destination address indicating a destination node for said message; and
determining an egress port out of which to route said message, said determination based on said destination address;
wherein said step of determining an egress port comprises the step of applying said destination address to a router table to determine an egress port of a next router, said egress port being a port out of which to route said message from said next router.

12. The method according to claim 11, wherein said step of determining an egress port comprises the step of applying said destination address to a router table to determine an egress port of said current router out of which to route said message to a next router.

13. The method according to claim 11, further comprising the steps of:
said current router reading a current egress port ID from a header of said message, said current egress port ID indicating an egress port of said current router out of which to route said message;
said current router arbitrating for said egress port of said current router while said current router applies said destination address to said router table to determine said egress port of said next router; and
said current router inserting said egress port of said next router into said message before routing said message to said next router.

14. In a multi-node network having a plurality of nodes connected by a plurality of edges and further having a plurality of routers for routing messages from a current node to a next node, a method of dynamically routing messages between node pairs in the network, the method comprising the steps of:

determining preferred routes between the node pairs of the network;

programming router tables to route a message from a current router to a next router along a preferred route between a node pair; and routing a message from a current router to a next router along the preferred route wherein the message comprises a destination address indicating a destination node for said message and wherein said routing step comprises the step of determining an egress port of said next router out of which to route said message, said determination based on said destination address.

15. The method according to claim 14, wherein said step of determining an egress port comprises the step of applying said destination address to a router table to determine an egress port of said current router out of which to route said message to a next router.

16. The method according to claim 14, wherein said step of determining an egress port comprises the step of applying said destination address to a router table to determine an egress port of a next router, said egress port being a port out of which to route said message when said message reaches said next router.

17. The method according to claim 16, further comprising the steps of:

said current router reading a current egress port ID from a header of said message, said current egress port ID indicating an egress port of said current router out of which to route said message;

said current router arbitrating for said egress port of said current router while said current router applies said destination address to said router table to determine said egress port of said next router; and said current router inserting said egress port of said next router into said message before routing said message to said next router.

\* \* \* \* \*

UNITED STATES PATENT AND TRADEMARK OFFICE
CERTIFICATE OF CORRECTION

PATENT NO. :   5,721,819

DATED        :   February 24, 1998

INVENTORS  :   Galles *et al.*

It is certified that an error appears in the above-identified patent and that said Letters Patent is hereby corrected as shown below.

In column 1, line 7, please delete "08/435,456" and insert --08/435,451--.

Signed and Sealed this

Fourteenth Day of July, 1998

*Attest:*

BRUCE LEHMAN

*Attesting Officer*     *Commissioner of Patents and Trademarks*